US010891610B2

(12) United States Patent
Powell et al.

(10) Patent No.: US 10,891,610 B2
(45) Date of Patent: Jan. 12, 2021

(54) NETWORK TOKEN SYSTEM

(71) Applicants: Visa International Service Association, San Francisco, CA (US); Mastercard International Incorporated, Purchase, NY (US)

(72) Inventors: Glenn Leon Powell, Fremont, CA (US); John F. Sheets, San Francisco, CA (US); Bruce Rutherford, Stamford, CT (US); Gregory Williamson, Stamford, CT (US); James Anderson, Mount Vernon, NY (US)

(73) Assignees: Visa International Service Association, San Francisco, CA (US); MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/514,290

(22) Filed: Oct. 14, 2014

(65) Prior Publication Data
US 2015/0127547 A1    May 7, 2015

Related U.S. Application Data

(60) Provisional application No. 61/906,377, filed on Nov. 19, 2013, provisional application No. 61/890,162, filed on Oct. 11, 2013.

(51) Int. Cl.
*G06Q 20/38* (2012.01)
*G06Q 20/40* (2012.01)
(Continued)

(52) U.S. Cl.
CPC .......... *G06Q 20/382* (2013.01); *G06Q 20/12* (2013.01); *G06Q 20/20* (2013.01); *G06Q 20/367* (2013.01);
(Continued)

(58) Field of Classification Search
CPC .................... G06F 17/60; H04L 9/32
(Continued)

(56) References Cited

U.S. PATENT DOCUMENTS

| 5,613,012 A | 3/1997 | Hoffman |
| 5,781,438 A | 7/1998 | Lee |

(Continued)

FOREIGN PATENT DOCUMENTS

| CN | 103023657 | 4/2013 |
| CN | 103236009 | 8/2013 |

(Continued)

OTHER PUBLICATIONS

International Search Report and Written Opinion dated Jan. 15, 2015 in Int'l Patent Application No. PCT/US2014/060523, 10 pages.

(Continued)

*Primary Examiner* — Calvin L Hewitt, II
*Assistant Examiner* — Nakia Leffall-Allen
(74) *Attorney, Agent, or Firm* — Kilpatrick Townsend & Stockton LLP

(57) ABSTRACT

Embodiments of the invention are directed to methods, apparatuses, computer readable media and systems for providing, along with a token, a token assurance level and data used to generate the token assurance level. At the time a token is issued, one or more Identification and Verification (ID&V) methods may be performed to ensure that the token is replacing a PAN that was legitimately used by a token requestor. A token assurance level may be assigned to a given token in light of the type of ID&V that is performed and the entity performing the ID&V. Different ID&Vs may result in different token assurance levels. An issuer may wish to know the level of assurance and the data used in gener- (Continued)

ating the level of assurance associated with a token prior to authorizing a payment transaction that uses the token.

12 Claims, 10 Drawing Sheets

(51) Int. Cl.
*G06Q 20/36* (2012.01)
*G06Q 20/12* (2012.01)
*G06Q 20/20* (2012.01)

(52) U.S. Cl.
CPC ........... *G06Q 20/385* (2013.01); *G06Q 20/40* (2013.01); *G06Q 20/4016* (2013.01)

(58) Field of Classification Search
USPC ................................................ 705/39; 726/9
See application file for complete search history.

(56) References Cited

U.S. PATENT DOCUMENTS

| | | |
|---|---|---|
| 5,883,810 A | 3/1999 | Franklin |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 6,999,943 B1 | 2/2006 | Johnson |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,559,464 B2 | 7/2009 | Routhenstein |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,171,525 B1 | 5/2012 | Pelly |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,327,142 B2 | 12/2012 | Lund et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |

(56) References Cited

U.S. PATENT DOCUMENTS

| | | |
|---|---|---|
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,478,898 B2 | 7/2013 | Harvey |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,613,055 B1 | 12/2013 | Tomilson et al. |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,682,802 B1 | 3/2014 | Kannanari |
| 8,726,361 B2 | 5/2014 | Radhakrishnan |
| 8,751,391 B2 | 6/2014 | Freund |
| 8,762,263 B2 | 6/2014 | Gauthier et al. |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,680,942 B2 | 6/2017 | Dimmick |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0038292 A1 | 3/2002 | Quelene |
| 2002/0073045 A1 | 6/2002 | Rubin |
| 2002/0116341 A1 | 8/2002 | Hogan |
| 2002/0120584 A1 | 8/2002 | Hogan |
| 2002/0133467 A1 | 9/2002 | Hobson |
| 2002/0147913 A1 | 10/2002 | Lun Yip |
| 2003/0028481 A1* | 2/2003 | Flitcroft ............ G06Q 20/00 705/39 |
| 2003/0061170 A1 | 3/2003 | Uzo |
| 2003/0101348 A1 | 5/2003 | Russo et al. |
| 2003/0120554 A1 | 6/2003 | Hogan |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0149440 A1 | 7/2005 | Michelassi |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2005/0278542 A1 | 12/2005 | Pierson et al. |
| 2006/0235795 A1* | 10/2006 | Johnson ............ G06Q 20/02 705/44 |
| 2006/0235796 A1 | 10/2006 | Johnson et al. |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0154770 A1 | 6/2008 | Rutherford et al. |
| 2008/0189214 A1* | 8/2008 | Mueller ............ G06Q 20/20 705/65 |
| 2008/0201264 A1 | 8/2008 | Brown |
| 2008/0201265 A1 | 8/2008 | Hewton |
| 2008/0203152 A1 | 8/2008 | Hammad et al. |
| 2008/0223918 A1 | 9/2008 | Williams |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048953 A1 | 2/2009 | Hazel et al. |
| 2009/0048971 A1 | 2/2009 | Hathaway |
| 2009/0106112 A1 | 4/2009 | Dalmia |
| 2009/0106160 A1 | 4/2009 | Skowronek |
| 2009/0117883 A1 | 5/2009 | Coffing et al. |
| 2009/0134217 A1 | 5/2009 | Flitcroft |
| 2009/0157555 A1 | 6/2009 | Biffle |

(56) References Cited

U.S. PATENT DOCUMENTS

| | | |
|---|---|---|
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0010930 A1 | 1/2010 | Allen et al. |
| 2010/0011215 A1 | 1/2010 | Lior et al. |
| 2010/0063895 A1* | 3/2010 | Dominguez ........... G06Q 20/02 705/26.1 |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235280 A1 | 9/2010 | Boyd et al. |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0029504 A1 | 2/2011 | King et al. |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0099377 A1 | 4/2011 | Hoornaert |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0225643 A1 | 9/2011 | Faynberg et al. |
| 2011/0237224 A1 | 9/2011 | Coppinger |
| 2011/0238511 A1 | 9/2011 | Park |
| 2011/0238573 A1 | 9/2011 | Varadarajan |
| 2011/0238576 A1 | 9/2011 | Patterson |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0276485 A1 | 11/2011 | Varga |
| 2011/0295745 A1 | 12/2011 | White |
| 2011/0302081 A1 | 12/2011 | Saunders |
| 2011/0307710 A1 | 12/2011 | McGuire et al. |
| 2012/0023567 A1* | 1/2012 | Hammad ............... G06Q 20/12 726/9 |
| 2012/0028609 A1 | 2/2012 | Hruska |
| 2012/0030047 A1* | 2/2012 | Fuentes ................. G06Q 20/04 705/26.1 |
| 2012/0035998 A1 | 2/2012 | Chien |
| 2012/0041881 A1* | 2/2012 | Basu ...................... G06Q 20/02 705/67 |
| 2012/0047237 A1 | 2/2012 | Arvidsson |
| 2012/0060207 A1 | 3/2012 | Mardikar et al. |
| 2012/0066078 A1 | 3/2012 | Kingston |
| 2012/0066758 A1 | 3/2012 | Kasturi |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0116976 A1 | 5/2012 | Hammad et al. |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0150669 A1 | 6/2012 | Langley |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0209778 A1 | 8/2012 | Delany |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0259782 A1 | 10/2012 | Hammad |
| 2012/0259784 A1* | 10/2012 | Carlson ................ G06Q 20/202 705/39 |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0036048 A1 | 2/2013 | Campos |
| 2013/0047245 A1 | 2/2013 | Radhakrishnan |
| 2013/0047254 A1 | 2/2013 | Radhakrishnan |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder ("J.D."), II et al. |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon et al. |
| 2013/0159184 A1 | 6/2013 | Thaw |
| 2013/0166402 A1 | 6/2013 | Parento |
| 2013/0166456 A1 | 6/2013 | Zhang |

(56) References Cited

U.S. PATENT DOCUMENTS

| | | |
|---|---|---|
| 2013/0168450 A1 | 7/2013 | Von Mueller et al. |
| 2013/0173736 A1 | 7/2013 | Krzeminski |
| 2013/0174244 A1 | 7/2013 | Taveau et al. |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204781 A1 | 8/2013 | Flitcroft |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0282589 A1 | 10/2013 | Shoup et al. |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0108263 A1 | 4/2014 | Ortiz et al. |
| 2014/0114857 A1 | 4/2014 | Griggs et al. |
| 2014/0143137 A1 | 5/2014 | Carlson |
| 2014/0149746 A1 | 5/2014 | Yau |
| 2014/0164243 A1 | 6/2014 | Aabye et al. |
| 2014/0165179 A1 | 6/2014 | Taveau |
| 2014/0188586 A1 | 7/2014 | Carpenter et al. |
| 2014/0249945 A1 | 9/2014 | Gauthier |
| 2014/0289809 A1 | 9/2014 | Taylor |
| 2014/0294701 A1 | 10/2014 | Dai et al. |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0066768 A1 | 3/2015 | Williamson |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0161608 A1 | 6/2015 | Gilbert et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0237038 A1 | 8/2015 | Grajek et al. |
| 2015/0237074 A1 | 8/2015 | Mardikar |
| 2015/0269566 A1 | 9/2015 | Gaddam et al. |
| 2015/0278729 A1 | 10/2015 | Hu et al. |
| 2015/0278799 A1 | 10/2015 | Palanisamy |
| 2015/0287037 A1 | 10/2015 | Salmon |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0332264 A1 | 11/2015 | Bondesen |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan |
| 2016/0103675 A1 | 4/2016 | Aabye et al. |
| 2016/0119296 A1 | 4/2016 | Laxminarayanan et al. |
| 2016/0132878 A1 | 5/2016 | O'Regan |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0308995 A1 | 10/2016 | Youdale et al. |
| 2017/0103387 A1 | 4/2017 | Weber |
| 2017/0109745 A1 | 4/2017 | Al-Bedaiwi |

(56) References Cited

U.S. PATENT DOCUMENTS

| | | | |
|---|---|---|---|
| 2017/0186001 | A1 | 6/2017 | Reed et al. |
| 2017/0295155 | A1 | 10/2017 | Wong et al. |
| 2017/0364903 | A1 | 12/2017 | Lopez |

FOREIGN PATENT DOCUMENTS

| | | | |
|---|---|---|---|
| EP | 2156397 | A1 | 2/2010 |
| JP | 2001344545 | | 12/2001 |
| JP | 2002366869 | | 12/2002 |
| JP | 2010165374 | | 7/2010 |
| RU | 2388053 | | 4/2010 |
| WO | 2001035304 | A1 | 5/2001 |
| WO | 2001035304 | A9 | 5/2001 |
| WO | 0193129 | | 12/2001 |
| WO | 2004042536 | A2 | 5/2004 |
| WO | 2006113834 | A2 | 10/2006 |
| WO | 2008144555 | | 11/2008 |
| WO | 2009032523 | A1 | 3/2009 |
| WO | 2009/112793 | A1 | 9/2009 |
| WO | 2010078522 | A1 | 7/2010 |
| WO | 2012068078 | A2 | 5/2012 |
| WO | 2012098556 | A1 | 7/2012 |
| WO | 2012142370 | A2 | 10/2012 |
| WO | 2012/151590 | A2 | 11/2012 |
| WO | 2012167941 | A1 | 12/2012 |
| WO | 2013048538 | A1 | 4/2013 |
| WO | 2013056104 | A1 | 4/2013 |
| WO | 2013/119914 | A1 | 8/2013 |
| WO | 2013179271 | A2 | 12/2013 |
| WO | 2015/013548 | A1 | 1/2015 |
| WO | 2015013522 | | 1/2015 |
| WO | 2015013548 | | 1/2015 |

OTHER PUBLICATIONS

U.S. Appl. No. 14/340,344, filed Jul. 24, 2014.
U.S. Appl. No. 14/340,444, filed Jul. 24, 2014.
U.S. Appl. No. 14/340,464, filed Jul. 24, 2014.
Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
Non-final Office Action dated Jan. 11, 2017, U.S. Appl. No. 14/340,444.
Wang, U.S. Appl. No. 62/000,288 (unpublished), Payment System Canonical Address Format filed May 19, 2014.
Sharma et al., U.S. Appl. No. 62/003,717 (unpublished), Mobile Merchant Application filed May 28, 2014.
Kalgi et al., U.S. Appl. No. 62/024,426, (unpublished) Secure Transactions Using Mobile Devices filed Jul. 14, 2014.
Prakash et al., U.S. Appl. No. 62/037,033 (unpublished), Sharing Payment Token filed Aug. 13, 2014.
Hoverson et al., U.S. Appl. No. 62/038,174 (unpublished), Customized Payment Gateway filed Aug. 15, 2014.
Wang, U.S. Appl. No. 62/042,050 (unpublished), Payment Device Authentication and Authorization System filed Aug. 26, 2014.
Gaddam et al., U.S. Appl. No. 62/053,736 (unpublished), Completing Transactions Without a User Payment Device filed Sep. 22, 2014.
Patterson, U.S. Appl. No. 62/054,346 (unpublished), Mirrored Token Vault filed Sep. 23, 2014.
Dimmick, U.S. Appl. No. 14/952,514 (unpublished), Systems Communications With Non-Sensitive Identifiers filed Nov. 25, 2015.
Dimmick, U.S. Appl. No. 14/952,444 (unpublished), Tokenization Request Via Access Device filed Nov. 25, 2015.
Prakash et al., U.S. Appl. No. 14/955,716 (unpublished), Provisioning Platform for Machine-To-Machine Devices filed Dec. 1, 2015.
Wong et al., U.S. Appl. No. 14/966,948 (unpublished), Automated Access Data Provisioning filed Dec. 11, 2015.
Stubbs et al., U.S. Appl. No. 62/103,522 (unpublished), Methods and Systems for Wallet Provider Provisioning filed Jan. 14, 2015.
McGuire, U.S. Appl. No. 14/600,523 (unpublished), Secure Payment Processing Using Authorization Request filed Jan. 20, 2015.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Sabba et al., U.S. Appl. No. 15/011,366 (unpublished), Token Check Offline filed Jan. 29, 2016.
Patterson, U.S. Appl. No. 15/019,157 (unpublished), Token Processing Utilizing Multiple Authorizations filed Feb. 9, 2016.
Cash et al., U.S. Appl. No. 15/041,495 (unpublished), Peer Forward Authorization of Digital Requests filed Feb. 11, 2016.
Le Saint et al., U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
U.S. Appl. No. 14/340,464, Final Office Action dated May 20, 2016, 24 pages.
U.S. Appl. No. 14/340,464, Non-Final Office Action dated Dec. 4, 2015, 23 pages.
International Application No. PCT/US2014/060523, International Preliminary Report on Patentability dated Apr. 21, 2016, 7 pages.
Non-final Office Action dated Jan. 31, 2017, U.S. Appl. No. 14/340,344, filed Jul. 24, 2014.
Final Office Action dated Jun. 26, 2017, U.S. Appl. No. 14/340,444 (35 pages).
Extended European Search Report, EP Application No. 14829301.2, dated Jun. 9, 2017, 7 pages.
International Search Report and Written Opinion for International Patent Application No. PCT/US2014/048083, dated Nov. 7, 2014, 11 pages.
International Search Report and Written Opinion for International Patent Application No. PCT/US2014/048038, dated Nov. 11, 2014, 12 pages.
White, "How Computers Work," Illustrated by Timothy Edward Downs ,7th Edition, Oct. 15, 2003, 23 pages.
Non-Final Office Action dated Dec. 1, 2016, U.S. Appl. No. 14/340,464, 33 pages.
Final Office Action dated May 2, 2017, U.S. Appl. No. 14/340,464, 38 pages.
Written Opinion, Singapore Application No. 11201602835W, dated Mar. 13, 2017, 5 pages.
Extended European Search Report, EP Application No. 14829301.2, dated Feb. 28, 2017, 8 pages.
"Device Fingerprinting and Fraud Protection Whitepaper Review", Retrieved from Internet Entire Document Pertitent, https://web.archive.org/web/20131001000000*/http://www.cse.iitd.ernet.in/-siy117527/sil765/readings/Device-Fingerprinting-and-Online-Fraud-Protection-Whitepaper.pdf, Dated Jun. 4, 2018, Oct. 8, 2011, 6 pages.
U.S. Appl. No. 14/732,458 , "Final Office Action", dated Jun. 8, 2018, 34 pages.
EP14853006.6 , "Office Action", dated Jul. 26, 2018, 7 pages.
JP2016-548003 , "Notice of Decision to Grant", dated Jul. 10, 2018, 3 pages.

(56) References Cited

OTHER PUBLICATIONS

SG11201602835W, "Notice of Decision to Grant", dated Jul. 17, 2018, 6 pages.
U.S. Appl. No. 14/340,344, "Final Office Action", dated Sep. 26, 2017, 26 pages.
U.S. Appl. No. 14/340,464, "Non-Final Office Action", dated Dec. 1, 2016, 33 pages.
EP14853006.6, "Extended European Search Report", dated Jun. 9, 2017, 7 pages.
Kaja, et al., U.S. Appl. No. 15/585,077 (Unpublished), System and Method Using Interaction Token, filed May 2, 2017.
Office Action dated Dec. 14, 2017 in U.S. Appl. No. 14/340,444, 27 pages.
Office Action (English Translation) dated Jan. 4, 2018 in Japanese Patent Application No. 2016-548003, 2 pages.
Written Opinion dated Jan. 4, 2018 in Singapore Patent Application No. 11201602835W, 6 pages.
Examination Report dated Jan. 16, 2018 in Australian Patent Application No. 2014331673, 4 pages.
Examination Report dated Jan. 22, 2018 in European Patent Application No. 14829301.2, 8 pages.
Examination Report dated Jan. 22, 2018 in European Patent Application No. 14829561.1, 6 pages.
Notice of Allowance dated Feb. 7, 2018 in U.S. Appl. No. 14/340,464, 25 pages.
CN201480068053.5, "Office Action", dated Jan. 3, 2019, 19 pages.
RU2016117997, "Office Action", dated Jul. 16, 2018, 8 pages.
U.S. Appl. No. 15/974,599, "Non-Final Office Action", dated Oct. 1, 2019, 25 pages.
U.S. Appl. No. 14/732,458, "Final Office Action", dated Aug. 2, 2019, 28 pages.
EP14829561.1, "Summons to Attend Oral Proceedings", dated Jul. 5, 2018, 10 pages.
U.S. Appl. No. 14/732,458, Non-Final Office Action, dated Jul. 31, 2020, 14 pages.
U.S. Appl. No. 15/974,599, "Final Office Action", dated May 1, 2020, 33 pages.
European Application No. 14853006.6, Summons to Attend Oral Proceedings dated May 14, 2020, 10 pages.
Extended European Search Report dated Feb. 28, 2017, EP Application No. 14829561.1.
Non-Final Office Action dated Dec. 1, 2016, U.S. Appl. No. 14/340,464.
India Application No. 201647016067, First Examination Report dated Aug. 25, 2020, 6 pages.

* cited by examiner

NETWORK TOKEN SYSTEM

CROSS-REFERENCES TO RELATED APPLICATIONS

This application claims benefit under 35 USC § 119(e) to U.S. Provisional Patent Application No. 61/890,162 filed Oct. 11, 2013 and entitled "Network Token System" and U.S. Provisional Patent Application No. 61/906,377 filed Nov. 19, 2013 and entitled "Network Token Standards", the disclosures of which are incorporated by reference herein in their entirety for all purposes.

BACKGROUND

The payments industry is evolving to support payment form factors that provide increased protection against counterfeit, account misuse, and other forms of fraud. While chip cards can provide substantial protection for card-present transactions, a similar need exists for further protections for card-not-present and hybrid transaction environments to minimize unauthorized use of account holder data and to prevent cross-channel fraud. Tokenization systems hold substantial promise to address these needs.

In a traditional electronic payment transaction, a consumer's primary account number (PAN) information is exposed to various entities involved during the transaction lifecycle. The PAN is passed from a merchant terminal, to an acquirer system, a payment processing network, payment gateways, etc.

Because the PAN can be exposed at various points in the transaction lifecycle, payment "tokens" have been developed to conduct payment transactions. A payment token serves as an additional security layer to the PAN and in effect becomes a proxy/surrogate to the PAN. Thus, the payment token may be used in place of PAN while initiating payment or submitting transactions. The use of payment tokens instead of PANs can reduce the risk of fraudulent activity since the real PAN is not exposed.

While conventional efforts to use payment tokens have been useful, a number of additional problems need to be solved. For example, because the real PAN is not apparent from a corresponding token, it is difficult to identify the source of the token or the issuer of the token. On the one hand, the token is intended to hide information. On the other hand, it would be useful to identify, from the payment token, the origin or the issuer of the token, a level of confidence that the user attempting to use the token is in fact the actual cardholder and data used to determine the level of confidence. Currently, techniques for identifying this information do not exist.

Moreover, tokens have traditionally been restricted to a particular network or payment processing system and have not supported interoperability between payment networks. Accordingly, the adoption and integration of tokens with various payment systems has been limited.

Embodiments of the present invention solve these problems and other problems, individually and collectively.

BRIEF SUMMARY

Embodiments of the present invention are directed to providing, along with a token, a token assurance level and data used to generate the token assurance level. At the time a token is issued, steps may be taken to ensure that the token is replacing a PAN that was legitimately being used by a token requestor. This process is known as Identification and Verification (ID&V) and may be performed each time a token is requested. A token assurance level may be assigned to a given token in light of the type of ID&V that is performed and the entity performing the ID&V. Different ID&Vs may result in different token assurance levels. An issuer may wish to know the level of assurance and the data used in generating the level of assurance associated with a token prior to authorizing a payment transaction that uses the token. The assurance level that is assigned to a given token may change over time and be re-calibrated based upon factors that influence its confidence levels such as any association with fraudulent transactions of fraud-related chargebacks, etc.

According to an exemplary embodiment, a method is provided. The method includes receiving, by a computer, an authorization request message from a requestor. The authorization request message comprises a payment token representing a primary account number. The primary account number may be assigned by an issuer. The authorization request message is for conducting a payment transaction using the primary account number. The method also includes receiving, by the computer, a token assurance level associated with the token along with data used to generate the token assurance level. The token assurance level may represent a level of trust in an association between the payment token and the primary account number represented by the payment token. The token assurance level may be based on an identification and verification method used when the payment token is generated. In some embodiments, the token assurance level is based on an entity performing the identification and verification method. Moreover, the method includes modifying, by the computer, the authorization request message to include the token assurance level and the data used to generate the token assurance level. The method further includes transmitting, by the computer, the modified authorization request message to the issuer for approval.

According to various embodiments, the method further includes, prior to receiving the authorization request message, receiving, by the computer, a token generation message for generation of the payment token to represent the primary account number. The token generation message may include a requested token assurance level associated with the payment token. The method may further include generating, by the computer, the payment token and the token assurance level associated with the payment token, and storing the payment token, the token assurance level and the primary account number associated with the payment token at a repository.

In some embodiments, the method may also include interacting with a repository storing a one-to-one mapping between one or more primary account numbers and one or more payment tokens generated for the one or more primary account numbers.

Another embodiment is directed to apparatuses, systems, and computer-readable media configured to perform the method described above.

Another exemplary embodiment is directed to a method including generating, by a computer, a payment token and a token assurance level associated with the payment token, the payment token representing a primary account number assigned by an issuer. The method also includes sending, by the computer, the payment token to a requestor and receiving, by the computer, an authorization request message from the requestor. The authorization request message may comprise the payment token. The authorization request message is for conducting a payment transaction using the primary account number. The method may further include modifying, by the computer, the authorization request message to include the token assurance level and data used to generate the token assurance level, and transmitting, by the computer, the modified authorization request message to the issuer for approval.

These and other embodiments are described in further detail below.

DETAILED DESCRIPTION

Figure 1:
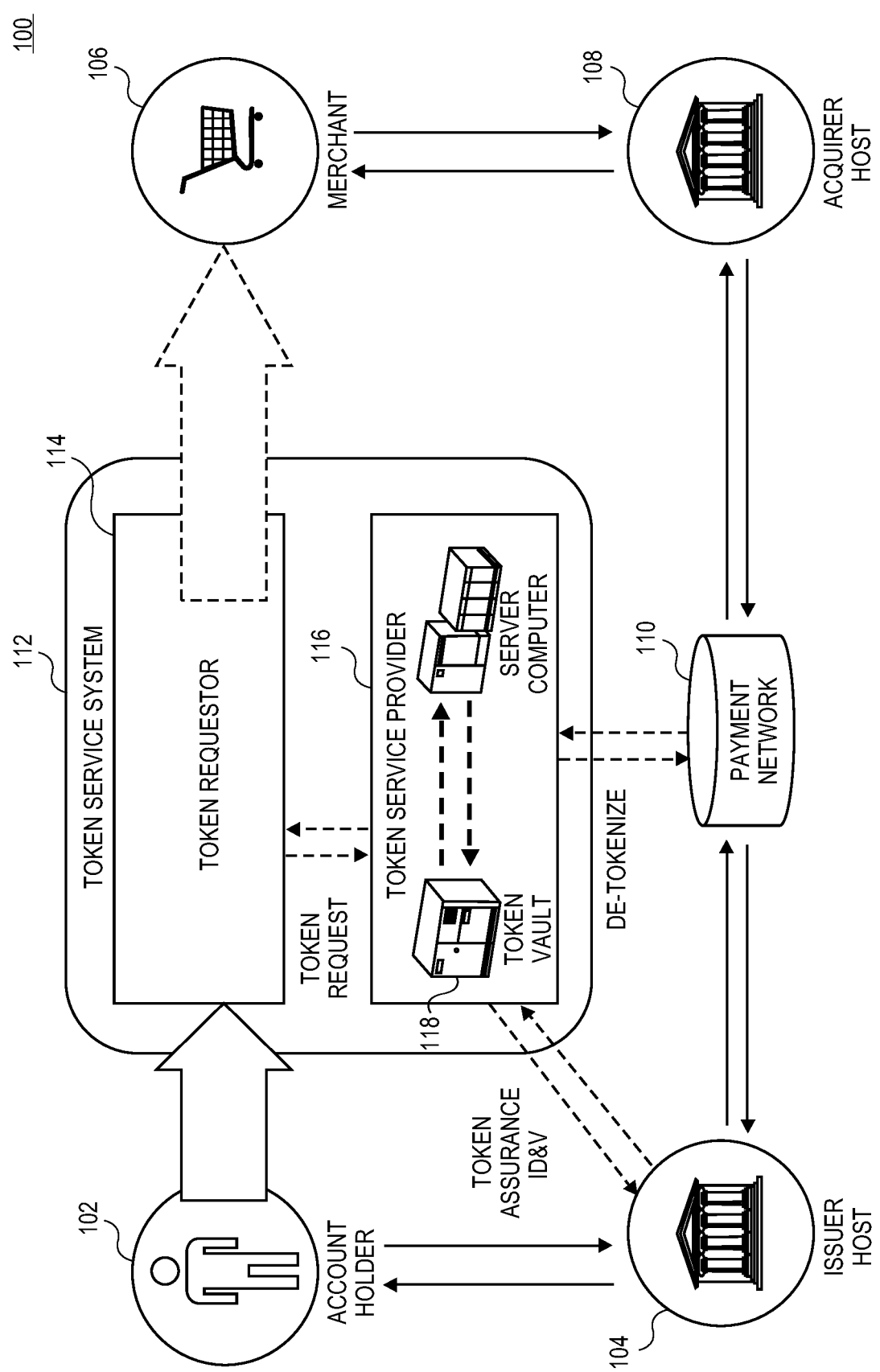
FIG. 1 shows a system and a flow diagram providing an overview of the various entity interactions in a tokenization ecosystem environment, according to an exemplary embodiment of the present invention.

Embodiments of the invention are directed to methods, apparatuses, computer readable media and systems for implementing and providing a network token system including token service interoperability formats and functionality that allows for generation, verification, validation, and use of tokens between payment processing networks.

Tokens include surrogate values that replace the Primary Account Numbers (PANs) in a payment ecosystem. Payment tokens may be used to originate payment transactions.

In order for payment tokens to provide improved protection against misuse, the token may be limited to use in a specific domain, such as to a specific merchant or channel. These underlying usage controls are a benefit of tokens and present embodiments describe methods for their implementation.

Additionally, at the time a token is issued, steps may be taken to ensure that the token is replacing a PAN that was legitimately being used by a token requestor. This process is known as Identification and Verification (ID&V) and may be performed each time a token is requested. A token assurance level may be assigned to a given token in light of the type of ID&V that is performed. Different ID&Vs may result in different token assurance levels. For example, no or minimal ID&V performed by a non-trusted entity may result in a low token assurance level, while a detailed ID&V performed by a trusted entity would likely result in a high token assurance level. Accordingly, the level of assurance associated with a token depends on the ID&V method performed when the token is generated, and the entity that performed the ID&V method. An issuer may wish to know the level of assurance and the data used in generating the level of assurance associated with a token prior to authorizing a payment transaction that uses the token.

There are benefits for all stakeholders in the payment ecosystem that may help encourage adoption of tokens. First, issuers and cardholders may benefit from new and more secure ways to pay, improved approval levels, and reduced risk of subsequent fraud in the event of a data breach. Further, acquirers and merchants may experience a reduced threat of online attacks and data breaches, as token databases may be less appealing targets given their limitation to a specific domain. Acquirers and merchants may also benefit from the higher assurance levels for large-value transactions that tokens may offer. Additionally, payment processing networks may be able to adopt an open format that facilitates interoperability and help reduce data protection processes for the network and its participants. Moreover, issuers may determine whether a transaction request including a token should be approved based on the token assurance level and the data used in generating the token assurance level associated with the token.

Embodiments of the present invention may describe the tokenization ecosystem environment (tokenization landscape), define roles of the entities necessary to support tokenization, identify impacts of embodiments of the invention, specify data fields associated with token requests, token issuance and provisioning, transaction processing, and identify necessary application programming interfaces (APIs). Embodiments of the present invention are designed to preserve interoperability within the payments industry. Embodiments are further designed to provide a token assurance level associated with a token along with data used in generating the token assurance level in an authorization request message transmitted to, for example, an issuer.

Embodiments of the present invention are also intended to provide a detailed description of the tokenization ecosystem, terminology definitions, responsibilities, and controls specific to entities within the ecosystem. Exemplary use cases, related transaction flows, and specific fields within these transaction flows across traditional payment functions, such as authorization, capture, clearing, and exception processing, are discussed below.

Before discussing specific embodiments and examples, some descriptions of terms used herein are provided below.

A "token" may include an identifier for a payment account that is a substitute for an account identifier, such as a primary account number (PAN). For example, a token may include a series of numeric and/or alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "Bank Identification Number (BIN)" may be assigned by a payment network to an issuer of a payment account. BINs may be consistent with industry account and issuer identification specifications (e.g. ISO 7812) such that the payment network assigning the BIN may be identified based on the BIN and associated account ranges.

In some embodiments, the token format may allow entities in the payment system to identify the issuer associated with the token. For example, the format of the token may include a token issuer identifier that allows an entity to identify an issuer. For instance, the token issuer identifier may be associated with an issuer's BIN of the underlying PAN in order to support the existing payment flow. The token issuer identifier may be a different number than the issuer's BIN and may be static. For example, if the issuer's BIN for an issuer is 412345, the token issuer identifier may be a token BIN of 428325 and this number may be static for all tokens issued from or for that issuer. In some embodiments, the token issuer identifier range (e.g., issuer token BIN range) may have the same attributes as the associated issuer card range and can be included in an issuer identifier routing table (e.g., BIN routing table). The issuer identifier routing table may be provided to the relevant entities in the payment system (e.g., merchants and acquirers).

A "token BIN" may refer to a specific BIN that has been designated only for the purpose of issuing tokens and may be flagged accordingly in BIN tables. Token BINs may not have a dual purpose and may not be used to issue both primary account numbers (PANs) and tokens.

A "token issuer identifier range (issuer BIN range)" may refer to a unique identifier (e.g., of 6 to 12 digits length) originating from a set of pre-allocated token issuer identifiers (e.g., 6 digit token BINs). For example, in some embodiments, one or more token BIN ranges can be allocated to each issuer BIN range that is associated with an issuer. In some embodiments, the token BIN ranges may be used to generate a payment token and may not be used to generate a non-payment token. In some embodiments, a token may pass the basic validation rules of an account number including, for example, a LUHN check or checksum validation that may be set up by different entities within the payment system. In some embodiments, a payment token issuer identifier may be mapped to a real issuer identifier (e.g., a BIN) for an issuer. For example, a payment token issuer identifier may include a six digit numerical value that may be associated with an issuer. For instance, any token including the payment token issuer identifier may be associated with a particular issuer. As such, the issuer may be identified using the corresponding issuer identifier range associated with the token issuer identifier. For example, a payment token issuer identifier "540000" corresponding to a payment token "5400 0000 0000 0001" can be mapped to an issuer identifier "553141" corresponding to a payment account identifier "553141 0900 0000 1234". In some embodiments, a payment token issuer identifier is static for an issuer. For example, a payment token issuer identifier (e.g., "540000") may correspond to a first issuer and another payment token issuer identifier (e.g., "550000") may correspond to a second issuer, and the first and second payment token issuer identifiers may not be changed or altered without informing all entities within the network token processing system. In some embodiments, a payment token issuer identifier range may correspond to an issuer identifier. For example, payment tokens including payment token issuer identifiers from "490000"-"490002" may correspond to a first issuer (e.g., mapped to issuer identifier "414709") and payment tokens including payment token issuer identifiers from "520000"-"520002" may correspond to a second issuer (e.g., mapped to real issuer identifier "517548"). Token BIN Ranges and assignment of tokens from these BIN ranges may be made available to the parties accepting the transaction to make routing decisions.

A "token service system" refers to a system that facilitates requesting, generating and issuing tokens, as well as maintaining an established mapping of tokens to primary account numbers (PANs) in a repository (e.g. token vault). The token service system may establish a token assurance level for a given token to indicate the confidence level of the token to PAN binding. The token service system may support token processing of payment transactions submitted using tokens by de-tokenizing the token to obtain the actual PAN. In various embodiments, the token service system may include a token requestor and a token service provider interacting with the token requestor.

A "token service provider" may refer to an entity including one or more server computers in a token service system that generates, processes and maintains tokens. The token service provider may include or be in communication with a token vault where the generated tokens are stored. Specifically, the token vault may maintain one-to-one mapping between a token and a primary account number (PAN) represented by the token. The token service provider may have the ability to set aside licensed BINs as token BINs to issue tokens for the PANs that may be submitted to the token service provider. Various entities of a tokenization ecosystem may assume the roles of the token service provider. For example, payment networks and issuers or their agents may become the token service provider by implementing the token services according to embodiments of the present invention. A token service provider may provide reports or data output to reporting tools regarding approved, pending, or declined token requests, including any assigned token requestor IDs. The token service provider may provide data output related to token-based transactions to reporting tools and applications and present the token and/or PAN as appropriate in the reporting output.

A "token vault" may refer to a repository that maintains established token-to-PAN mappings. According to various embodiments, the token vault may also maintain other attributes of the token requestor that may be determined at the time of registration and that may be used by the token service provider to apply domain restrictions or other controls during transaction processing. The token vault may be a part of the token service system. In some embodiments, the token vault may be provided as a part of the token service provider. Alternatively, the token vault may be a remote repository accessible by the token service provider. Token vaults, due to the sensitive nature of the data mappings that are stored and managed in them, may be protected by strong underlying physical and logical security.

An "identification and verification (ID&V) method" may be used to ensure that the payment token is replacing a PAN that was legitimately being used by the token requestor. Examples of ID&V methods may include, but are not limited to, an account verification message, a risk score based on assessment of the primary account number (PAN) and use of one time password by the issuer or its agent to verify the account holder. Exemplary ID&V methods may be performed using information such as a user signature, a password, an offline or online personal identification number (PIN), an offline or online enciphered PIN, a combination of offline PIN and signature, a combination of offline enciphered PIN and signature, user biometrics (e.g. voice recognition, fingerprint matching, etc.), a pattern, a glyph, knowledge-based challenge-responses, hardware tokens (multiple solution options), one time passwords (OTPs) with limited use, software tokens, two-channel authentication processes (e.g., via phone), etc. Using the ID&V, a confidence level may be established with respect to the token to PAN binding.

A "token assurance level" may refer to an indicator or a value that allows the token service provider to indicate the confidence level of the token to PAN binding. The token assurance level may be determined by the token service provider based on the type of identification and verification (ID&V) performed and the entity that performed the ID&V. The token assurance level may be set when issuing the token. The token assurance level may be updated if additional ID&V is performed.

A "requested token assurance level" may refer to the token assurance level requested from the token service provider by the token requestor. The requested token assurance level may be included in a field of a token request message send by the requestor to the token service provider for the generation/issuance of the token.

An "assigned token assurance level" may refer to the actual (i.e. generated) value assigned by the token service provider to the token as the result of the identification and verification (ID&V) process performed by an entity within the tokenization ecosystem. The assigned token assurance level may be provided back to the token requestor in response to the token request message. The assigned token assurance level may be different than the requested token assurance level included in the token request message.

"Token attributes" may include any feature or information about a token. For example, token attributes may include information that can determine how a token can be used, delivered, issued, or otherwise how data may be manipulated within a transaction system. For example, the token attributes may include a type of token, frequency of use, token expiry date and/or expiry time, a number of associated tokens, a transaction lifecycle expiry date, and any additional information that may be relevant to any entity within a tokenization ecosystem. For example, token attributes may include a wallet identifier associated with the token, an additional account alias or other user account identifier (e.g., an email address, username, etc.), a device identifier, an invoice number, etc. In some embodiments, a token requestor may provide token attributes at the time of requesting the generation of tokens. In some embodiments, a network token system, payment network associated with the network token system, an issuer, or any other entity associated with the token may determine and/or provide the token attributes associated with a particular token.

The token attributes may identify a type of token indicating how the token may be used. A payment token may include a high value token that can be used in place of a real account identifier (e.g., PAN) to generate original and/or subsequent transactions for a consumer account and/or card. Another token type may be a "static" or "dynamic" token type for static and dynamic tokens, respectively.

A "token presentment mode" may indicate a method through which a token is submitted for a transaction. Some non-limiting examples of the token presentment mode may include machine readable codes (e.g., quick response code (QRC), barcode, etc.), mobile contactless modes (e.g., near-field communication (NFC) communication), e-commerce remote modes, e-commerce proximity modes, and any other suitable modes in which to submit a token. Tokens may be provided through any number of different methods. For example, in one implementation, a token may be embedded in machine-readable code which may be generated by a wallet provider, mobile application, or other application on mobile device and displayed on a display of the mobile device. The machine readable code can be scanned at the POS through which the token is passed to the merchant. A mobile contactless mode may include passing the token through NFC in a contactless message. An e-commerce remote mode may include submitting a token by a consumer or a wallet provider through an online transaction or as an e-commerce transaction using a merchant application or other mobile application. An e-commerce proximity mode may include submitting a token by a consumer from a wallet application on a mobile device at a merchant location.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other-information which may be replaced with a substitute value (i.e., token). Tokenization may be used to enhance transaction efficiency, improve transaction security, increase service transparency, or to provide a method for third-party enablement.

"Token exchange" or "de-tokenization" is a process of restoring the data that was substituted during tokenization. For example, a token exchange may include replacing a payment token with a corresponding primary account number (PAN) that was associated with the payment token during tokenization of the PAN. Thus, the de-tokenization may refer to the process of redeeming a token for the associated PAN value based on a token-to-PAN mapping stored, for example, in a token vault. The ability to retrieve a PAN in exchange for the associated token may be restricted to specifically authorized entities, individuals, applications, or systems. Further, de-tokenization or token exchange may be applied to any other information. In some embodiments, token exchange may be achieved via a transactional message, such as an ISO message, an application programming interface (API), or another type of web interface (e.g., web request).

A "token requestor" may refer to an entity that is seeking to implement tokenization according to embodiments of the present invention. The token requestor may initiate a request that a primary account number (PAN) be tokenized by submitting a token request message to the token service provider. According to various embodiments discussed herein, a token requestor may no longer need to store a PAN associated with a token once the requestor have received the token in response to a token request message. The requestor may be an application, a device, a process, or a system that is configured to perform actions associated with tokens. For example, a requestor can request registration with a network token system, request token generation, token activation, token de-activation, token exchange, other token lifecycle management related processes, and/or any other token related processes. A requestor may interface with a network token system through any suitable communication networks and/or protocols (e.g., using HTTPS, SOAP and/or an XML interface among others). Some non-limiting examples of token requestors may include, for example, card-on-file merchants, acquirers, acquirer processors, and payment gateways acting on behalf of merchants, payment enablers (e.g., original equipment manufacturers, mobile network operators, etc.), digital wallet providers, issuers, third party wallet providers, and/or payment processing networks. In some embodiments, a token requestor can request tokens for multiple domains and/or channels. A token requestor may be registered and identified uniquely by the token service provider within the tokenization ecosystem. During token requestor registration, the token service provider may formally process token requestor's application to participate in the token service system. The token service provider may collect information pertaining to the nature of the requestor and relevant use of tokens to validate and formally approve the token requestor and establish appropriate domain restriction controls. Successfully registered token requestors may be assigned a token requestor identifier that may also be entered and maintained within the token vault. Token requestors be revoked or assigned new token requestor identifiers. This information may be subject to reporting and audit by the token service provider.

A "token requestor identifier (ID)" may include any characters, numerals, or other identifiers associated with an entity associated with a network token system. In some embodiments, a unique token requestor ID may be assigned for each domain for a token request associated with the same token requestor. For example, a token requestor ID can identify a pairing of a token requestor (e.g., a mobile device, a mobile wallet provider, etc.) with a token domain (e.g., e-commerce, contactless, etc.). A token requestor ID may include any format or type of information. For example, in one embodiment, the token requestor ID may include an alphanumerical value such as a ten digit or an eleven digit letter and/or number (e.g., 4678012345). In some embodiments, a token requestor ID may include a code for a token service provider (e.g., first 3 digits) such as the network token system and the remaining digits may be assigned by the token service provider for each requesting entity (e.g., mobile wallet provider) and the token domain (e.g., contactless, e-commerce, etc.).

A "token request indicator" may refer to an indicator used to indicate that the message containing the indicator is related to a token request. The token request indicator may optionally be passed to the issuer as part of the Identification and Verification (ID&V) method to inform the issuer of the reason the account status check is being performed.

A "token domain" may indicate the factors that can be established at the time of token issuance to enable appropriate usage of the token for payment transactions. Examples of the token domain may include, but are not limited to, a POS entry mode, and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction.

"Token expiry date" may refer to the expiration date/time of the token that is generated by the token service provider and maintained in the token vault. The token expiry date may be passed among the entities of the tokenization ecosystem during transaction processing to ensure interoperability and minimize the impact of tokenization implementation. The token expiration date may be a numeric value (e.g. a 4-digit numeric value) that is consistent with the industry standards.

"Token interoperability" may refer to a process to ensure that the processing and exchanging of transactions between parties through existing interoperable capabilities is preserved when using tokens with new data fields and data field values that are defined in embodiments of the present invention.

"Token Processing" may refer to transaction processing in which a token is present in lieu of the primary account number (PAN). The token is processed from the point of interaction throughout the network. The token processing further includes using the token vault for de-tokenization of the token in order to complete the transaction. Token processing may span payment processes that include authorization, capture, clearing, and exception processing.

A "consumer" may include an individual or a user that may be associated with one or more personal accounts and/or consumer devices. The consumer may also be referred to as a cardholder, account holder, or user.

A "primary account number (PAN)" may be a variable length, (e.g. 13 to 19-digit) industry standard-compliant account number that is generated within account ranges associated with a BIN by an issuer.

A "card-on-file (COF)" merchant may include any entities that store account details (e.g., card details, payment account identifiers, PANs, etc.) for use in transactions. For example, a COF entity may store payment information on file for various types of periodic payments such as monthly utility payments, periodic shopping transactions, or any other periodic or future transaction. Because payment credentials and/or associated tokens are stored at an entity for a future transaction, the transactions initiated by a COF entity include card-not-present (CNP) transactions. Another type of card-not-present (CNP) transaction includes electronic commerce ("e-commerce") transactions that are initiated between remote parties (e.g., a consumer device and a merchant web server computer).

An "authorization request message" may be an electronic message that is sent to a payment processing network and/or an issuer of a payment account to request authorization for a payment transaction. An authorization request message according to some embodiments may comply with ISO 8583, which is a standard for systems that exchange electronic transaction information associated with a payment made by a consumer using a payment device or a payment account. In some embodiments of the invention, an authorization request message may include a payment token, an expiration date, a token presentment mode, a token requestor identifier, a token cryptogram, a token assurance level, and data used to generate the token assurance level. The payment token may include a payment token issuer identifier that may be a substitute for a real issuer identifier for an issuer. An authorization request message may also comprise additional data elements corresponding to "identification information"

including, for example, a service code, a CVV or CVC (card verification value or code), a dCVV or dCVC (dynamic card verification value or code), token cryptogram, an expiration date, etc. An authorization request message may also comprise "transaction information," such as any information associated with a current transaction (e.g. the transaction amount, merchant identifier, merchant location, etc.) as well as any other information that may be utilized in determining whether to identify and/or authorize a payment transaction.

An "authorization response message" may be an electronic message reply to an authorization request message generated by an issuing financial institution (i.e. issuer) or a payment processing network. The authorization response message may include an authorization code, which may be a code that an account issuing bank returns in response to an authorization request message in an electronic message (either directly or through the payment processing network) to the merchant's access device (e.g. POS terminal) that indicates approval of the transaction. The code may serve as proof of authorization. As noted above, in some embodiments, a payment processing network may generate and/or forward the authorization response message to the merchant.

A "server computer" may typically be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer or an issuer.

An "issuer" can include a payment account issuer. The payment account (which may be associated with one or more payment devices) may refer to any suitable payment account including a credit card account, a checking account, a savings account, a merchant account assigned to a consumer, or a prepaid account.

An "agent" may be an entity appointed by the issuer to perform specific functions on behalf of the issuer. Exemplary functions may include card processing, cardholder verification using the 3-D Secure protocol, and token service. For example, an Access Control Server (ACS) may be an agent of the issuer that provides a 3D-Secure service for identification and verification (ID&V).

A "payment network" may refer to an electronic payment system used to accept, transmit, or process transactions made by payment devices for money, goods, or services. The payment network may transfer information and funds among issuers, acquirers, merchants, and payment device users.

I. Tokenization Ecosystem Environment

The implementation of token solutions as outlined by embodiments of the present invention, and in a manner consistent with embodiments of the present invention itself, involves a number of entities within the tokenization ecosystem environment illustrated in FIG. 1.

FIG. 1 shows a system and a flow diagram providing an overview of the various entity interactions in a tokenization ecosystem environment 100, according to an exemplary embodiment of the present invention. The tokenization ecosystem environment 100 may include an account holder 102, a merchant 106, an acquirer 108, a payment network 110 and an issuer 104. A token requestor 114 and a token service provider 116 may form a token service system 112 which is also a part of the tokenization ecosystem environment 100. The token service provider 116 may include a token vault 118 and a server computer 120 (such as one illustrated in greater detail in FIG. 10). As will be discussed below, various entities of the tokenization ecosystem environment 100 may assume the role of the token requestor 114.

Similarly, different entities of the tokenization ecosystem environment 100 may assume the role(s) of the token service provider 116. The roles for each of these entities will be described next in more detail.

The issuer 104 may represent an issuer processor of a business entity (e.g., a bank) that may have issued an account (e.g., credit account, debit account, etc.) for payment transactions. In some implementations, the business entity (bank) associated with the issuer 104 may also function as an acquirer 108. The issuer 104 may issue an account represented by a primary account number (PAN) to an account holder 102, upon request of the account holder 102. The account holder 102 may use the account to conduct payment transactions. The issuer 104 may be responsible for authorization and ongoing risk management in the tokenization ecosystem environment 100. The issuer 104 may need to accommodate any data fields provided in messages passed to and from the issuer, as defined in embodiments of the present invention in order to properly process payment transaction requests.

The account holder 102 may wish to conduct a payment transaction with a merchant 106 using the account (represented by the PAN) issued by the issuer 104. For security purposes discussed herein, the account holder 102 may not wish to share the PAN with the merchant 106. Accordingly, a token representing the PAN may be generated by the token service system 112 and passed to the merchant server 106 (e.g. a merchant server or computer).

In some embodiments, the token may be passed through a near field communication (NFC) (e.g. point-of-sale use case). Yet in other embodiments, the merchant 106 may already know the PAN of the account holder 102 (e.g. card-on-file use case). For example, the card-on-file merchant may store the account information of the account holder 102 on file (e.g., at a merchant database) for future payment purposes, such as various types of periodic payments (e.g., monthly utilities payments). In some implementations, an account holder 102 may register with one or more merchants 106 for card-on-file services. If the merchant 106 is a card-on-file merchant, then the merchant 106 may be the token requestor 114. When the merchant 106 is the token requestor 114, the merchant 106 may need to accommodate the implementation of token service APIs that may be referenced in embodiments of the present invention. The various use cases will be discussed below in greater detail.

According to various embodiments, card-on-file merchants, acquirers, acquirer processors, payment gateways on behalf of merchants, payment enablers (e.g., original equipment manufacturer (OEM) device manufacturers), digital wallet providers or issuers may assume the role(s) of the token requestor 114. The token requestor 114 may register with the token service provider 116 (i.e. a server computer 120 of the service provider 116). After successful registration with the token service provider 116, the token requestor 114 may be assigned a token requestor ID. The token requestor 114 may implement a specified token API after being registered with the token service provider 116. The various APIs that may be used in connection with embodiments of the present invention are discussed below in connection with FIG. 9. The token requestor 114 may be able to initiate a token request with the token service provider 116 in accordance with the processes and technologies specified within the API. The token request may be initiated by passing a token request message to the token service provider 116. The token request message may include token requestor information or token requestor ID, token domain restriction controls, PAN to be represented (e.g. replaced) by the token and, optionally, a requested token assurance level.

When the token service provider 116 processes the token request message sent by the token requestor 114, the token service provider 116 may issue a token. The issued token may be stored at the token vault 118 and provided to the token requestor 114. At the time of token generation, the token service provider 116 may identify and store a token-to-PAN mapping in the token vault 118 for use in subsequent transaction processing. The token vault 118 may also permanently associate each generated token with the token requestor 114 that initiated the request by capturing and storing the token requestor ID.

In some embodiments, tokens that are generated by the token service provider 116 may be accompanied by a token expiry date. The token expiry date may meet the format of a PAN expiry date and may be the same date or different date than the actual PAN. In various embodiments, tokens that are generated in response to a token request from the token requestor 114 are only valid for transactions within the token domain for which the token has been issued.

Accordingly, the token service provider 116 may be an entity within the tokenization ecosystem environment 100 that may be authorized to generate and/or provide tokens to the token requestor 114. In some embodiments, the token requestor 114 may be registered with the token service provider 116. According to exemplary embodiments of the present invention, the payment network 110, the issuer 104 or an agent of the issuer 104 may serve as the token service provider 116.

The token service provider 116 may be responsible for a number of discrete functions in its capacity as the authorized party for issuance of tokens. One or more of the functions of the token service provider 116 may be performed by the server computer 120. The token service provider 116 may be responsible for the ongoing operation and maintenance of the token vault 118 storing the generated tokens and a mapping between the tokens and PANs represented by the tokens. The token service provider 116 may be responsible for token generation and issuance, as well as application of security and controls to the generated tokens. The token service provider 116 may register the token requestor 114 and provision the generated token on requestor's devices.

The token service provider 116 may be responsible for building and/or managing its own proprietary application programming interface (API) for the token requestor 114, token vault 118, token provisioning platform, and token registry. The token service provider 116 may ensure that token BINs may be managed distinctly from traditional BINs, in part to avoid any inadvertent overlap of PANs and tokens. The token service provider 116 may generate a token using token BINs in such a way as to ensure the preservation of product and other attributes of the PAN throughout all existing transaction processes.

According to various embodiments, when the token service provider 116 issues a token for a PAN associated with an account, the account holder 102 may not know that the token has been issued to represent the account. In some embodiments, the account holder 102 may be asked to participate in the identification and verification (ID&V) process during token generation. For example, the account holder 102 may be asked to provide an identification information to ensure that the token is being generated for an account rightfully owned by the account holder 102.

Based on the type of the ID&V performed, the token service provider 116 may also generate a token assurance level associated with the generated token during the issuance of the token. The token assurance level may represent a level of trust in an association between the payment token and the PAN represented by the payment token. For example, a high token assurance level represents a trusted association of the token to the PAN from an authorized account holder, that may support secure and reliable payment transactions initiated with payment. The generated token assurance level may be different from the requested token assurance level that may be optionally provided to the token service provider 116 by the requestor 114 in the token request message. In some embodiments, based on the type of ID&V performed or the entity performing the ID&V, the generated token assurance level may be the same as the requested token assurance level. Token assurance levels may change once assigned and may be recalculated based upon factors that may influence confidence levels such as reported fraud or fraud-related chargebacks, etc.

The token assurance level generated by the token service provider 116 may be based on the ID&V that was performed and the entity performing the ID&V. ID&V methods may be used singularly or in combination to provide a specific token assurance level. The token service provider 116 may implement one or more ID&V methods. Additionally, the token service provider 116 may ensure that the ID&V method(s) appropriate for the requested token assurance level are always performed when issuing a token.

ID&V steps may be performed by the token service provider 116, the token requestor 114, or a third party. In instances where the ID&V steps are performed by an entity other than the token service provider 116, verifiable evidence may be provided to prove that the steps were performed and the resulting outcomes were provided. Verifiable evidence may consist of any value provided to the token service provider 116 by the ID&V processing entity that the token service provider 116 may validate. Examples of verifiable evidence may include a cryptogram or an authorization code. These may apply to all ID&V methods, with the exception of conditions in which the ID&V is not performed. The token service provider 116 may set the token assurance level to the appropriate value(s) on the basis of the ID&V performed, and the token storage and usage information provided by the token requestor 114 at the time of token requestor registration.

According to various embodiments of the present invention, the token assurance levels may range from no assurance to high assurance depending on the ID&V methodology performed, the entity performing the ID&V and the token service provider 116 that confirms the result of the assessment. Exemplary ID&V methods may include, but are not limited to, (1) no ID&V performed, (2) account verification, (3) token service provider risk score, (4) token service provider risk score with token requestor data, and (5) issuer authentication of the account holder. One of ordinary skill in the art will appreciate that the foregoing ID&V methods are provided for illustration purposes only and that additional ID&V methods may be defined and performed in accordance with embodiments of the present invention.

(1) No ID&V Performed

When a token is issued without any ID&V method being performed at the time of token issuance, the token assurance level may indicate (e.g. the token assurance level value may be set to) "No Assurance". In some embodiments, no ID&V may result in the lowest token assurance level being assigned to the issued token. Depending on the token use case and token service provider rules, the token may still be used to initiate payment transactions, but may not carry any token assurance or may carry low token assurance. Additional restrictions for using tokens with no assurance level may be implemented according to embodiments of the present invention.

(2) Account Verification

The account verification may represent an ID&V assurance method which provides a basic account verification check to validate if the PAN is active and valid. In various embodiments, the account verification may include: $0 authorization, card verification number validation, and postal code and address verification. The account verification method may be performed, for example, by the token requestor 114 and reported to the token service provider 116 through token service API. The account verification method may also be performed by the token service provider 116 at the time of the token issuance. When a token is issued by performing account verification at the time of token issuance, the token assurance level may indicate (e.g. the token assurance level value may be set to) "token requestor verification performed" or "token requestor assured".

(3) Token Service Provider Assurance

Token service provider assurance is a type of ID&V assurance method which involves the token service provider 116 performing a risk-based assessment of the likelihood that the request to tokenize a PAN is assured with sufficient level of confidence. The token service provider 116 may perform the risk-based assessment using the risk and authentication data maintained by the token service provider 116. When a token is issued with the token service provider assurance, the token assurance level may indicate (e.g. the token assurance level value may be set to) "Token Service Provider Assured". In some embodiments, the token service provider assurance may result in a medium token assurance level being assigned to the issued token.

(4) Token Service Provider Assurance with Requestor Data

Token service provider assurance with requestor data is a ID&V assurance method which involves the use of data elements provided by the token requestor 114 that could be predictive of fraud. For example, the token requestor 114 may provide, among other information, account age and history, bill to/ship to addresses and contact information, IP address, device ID and device information, geo-location, and transaction velocity. The token service provider 116 may have appropriate assessment techniques and tools in place to implement this ID&V method and may combine the resulting ID&V data with the token service provider risk and authentication data related to the PAN to determine the assigned token assurance level. When a token is issued with the token service provider assurance with requestor data, the token assurance level may indicate (e.g. the token assurance level value may be set to) "Token Service Provider Assured with Requestor Data". In some embodiments, the token service provider assurance may result in a medium token assurance level being assigned to the issued token.

(5) Issuer Verification of the Account Holder

Issuer verification of the account holder is an ID&V method which involves interacting with the issuer 104 or issuer agent(s) to perform account holder verification for satisfying the assurance necessary to complete the binding of the token to the PAN. Methods used for verification may be implemented to provide an acceptable user experience based on the device type (e.g. mobile phone, computer, etc.) that the account holder may use during the authentication process. In some embodiments, device guidelines may be created and followed to ensure a consistent user experience. The issuer authentication may be designed to leverage input data and scores from the token requestor 114 in order for the issuer 104 to deliver the most intelligent experience possible to the account holder 102. The use of this data may allow the issuer 104 to have confidence that the genuine and authorized account holder 102 is in fact requesting the token (or the token is being requested for the genuine and authorized account holder 102) without having to add extra steps to the process. The input data requested/obtained from the account holder 102 may include, among others, geo-location, device information, IP address, consumer information (e.g., email address, mobile phone number, landline phone number, confirmed shipping address, consumer ID&V, and age of customer relationship), and account information (e.g., length of time in wallet and/or account activity, such as none, recent, or not recent). When a token is issued with the issuer verification of the account holder, the token assurance level may indicate (e.g. the token assurance level value may be set to) "Issuer Assured". In some embodiments, the issuer verification of the account holder may result in a high or the highest token assurance level being assigned to the issued token.

According to various embodiments, the issuer verification of the account holder may be performed via 3-D Secure Access Control Server (ACS), mobile banking verification of the account holder with an authentication code, federated login systems, API functionality capable of generating, delivering, and validating data from the token requestor and shared secrets, one-time password (OTP), activation code, or other shared secret between the issuer 104 and the account holder 102. If the issuer 104 determines that there is a need to verify the account holder 102 requesting the token through an explicit verification (e.g. using an OTP or activation code), the shared secret may be delivered to the account holder 102 through an out-of-band channel.

The issuer 104 may use a plurality of methods for account holder authentication. According to some embodiments, static passwords and enrollment in an authentication service at the time of the account holder authentication may not be allowed for ID&V methods. In contrast, as provided above, one-time passwords may be used for account holder authentication by the issuer 104. When an OTP is used, the issuer 104 may require that the OTP has a length of at least 6 digits and no more than 8 digits, the OTP is generated using a uniform methodology, and the preferred method for delivery is a secure channel from the issuer 104 to a consumer device of the account holder 102 (e.g. a mobile banking application installed on the consumer device).

Referring back to FIG. 1, when the token and the associated token assurance level are generated, the token service provider 116 may store the generated token, the PAN represented by the token, the token assurance level associated with the token, and data (e.g. the type of ID&V performed, the data used in performing the ID&V, the entity performing the ID&V, etc.) used to generate the token assurance level in a repository, such the token vault 118.

The token vault 118 may provide the capability for generation and issuance of tokens, establish and maintain token-to-PAN mapping, and provide underlying security and related processing controls, such as domain restrictions during transaction processing. The token vault 118 may provide the mechanism for token-to-PAN mapping to be made available during transaction processing such as authorization, clearing, and exception processing. The token vault 118 may need to maintain all associated tokens mapped to a given PAN throughout its lifecycle.

The token generated by the token service provider 116 may be provided to the token requestor 114 in response to the token request of the token requestor 114. As provided above, the token requestor 114 may be registered with the token service provider 116. The token service provider 116 may provide the generated token to the token requestor 114 when the token service provider 116 recognizes the token requestor ID assigned to the token requestor 114 during registration. Token issuance may also involve provisioning of the token to the token requestor 114. Token provisioning may occur after the token has been generated and the assurance steps are completed. Token provisioning may be performed through an interface between the token requestor 114 and the token service provider 116.

If the token requestor 114 is the account holder 102, upon receiving the token, the account holder 102 may present the token to the merchant 106 in a payment authorization request message. Alternatively, if the token requestor 114 is the merchant 106, the token may be directly provided to the merchant 106 by the token service provider 116. The merchant 106 may generate the payment authorization request message. The payment authorization request message may be for conducting a payment transaction using the primary account number represented by the token included in the payment authorization request message. The merchant 106 may send the payment authorization request message including the token to an acquirer 108 for further processing.

The acquirer 108 may be a system (acquirer computer or server) for an entity (e.g., a bank) that has a business relationship with the merchant 106. The acquirer 108 may issue and manage a financial account for the merchant 106. In general, the acquirer 108 may be responsible for authorization, capture, clearing and exception processing within the tokenization ecosystem environment 100. The acquirer 108 may be communicatively coupled to the merchant 106 and the payment processing network 110. The acquirer computer 108 may be configured to route the authorization request message including the token to the issuer computer 104 via the payment processing network computer 110. The acquirer computer 108 may also route an authorization response message received from the issuer computer 104 via the payment processing network computer 110 to the merchant computer 106.

The payment network 110 (also referred as a payment processing network) may be communicatively coupled to the issuer 104 and the acquirer 108. The payment network 110 may be configured to provide authorization services, and clearing and settlement services for payment transactions. The payment network 110 may include data processing subsystems, wired or wireless networks, including the internet. The payment network 110 may include a server computer. In some implementations, the payment network 110 may forward the authorization request message received from the acquirer 108 to the issuer 104 via a communication channel. The authorization request message received from the acquirer 108 may include a token.

The payment network 110 may communicate with the token service provider 116 to obtain a token assurance level associated with the token. The token assurance level may represent a level of trust in an association between the payment token and the PAN represented by the payment token. The token assurance level may be generated by the token service provider 116 when the token is generated, and stored in the token vault 118 along with the payment token. The payment network 110 may modify the authorization request message received from the acquirer 108 to include the token assurance level and data (e.g. the type of ID&V performed, the data used in performing the ID&V, the entity performing the ID&V, etc.) used to generate the token assurance level. The payment network 110 may also modify the authorization request message to include the PAN represented by the token included in the authorization request message. The payment network 110 may then forward the modified authorization request message to the issuer 104. The payment network 110 may receive an authorization response message from the issuer computer 170 and forward the received authorization response message to the acquirer 108. In some embodiments, the payment network 110 may modify the authorization response message received from the issuer 104 before forwarding the authorization response message to the acquirer 108. For example, the payment network 110 may modify the authorization response message to remove the PAN (e.g. replace the PAN with the token), if the PAN was included in the authorization response message and may include the last 4 digits of the PAN in the authorization response message.

According to various embodiments of the present invention, the payment network 110 may serve as the token service provider 116. An exemplary embodiment where the payment network 110 serves as the token service provider 116 is discussed below in greater detail in connection with FIG. 2. The payment network 110 performing as the token service provider 116 may be responsible for building and/or managing their own proprietary token requestor API, token vault, token provisioning platform, and token registry. A payment network 110 that is not the token service provider 116 may support the implementation of processing functions that allow for the exchange of messages with the token service provider 116 for de-tokenization purposes to ensure token interoperability.

Figure 2:
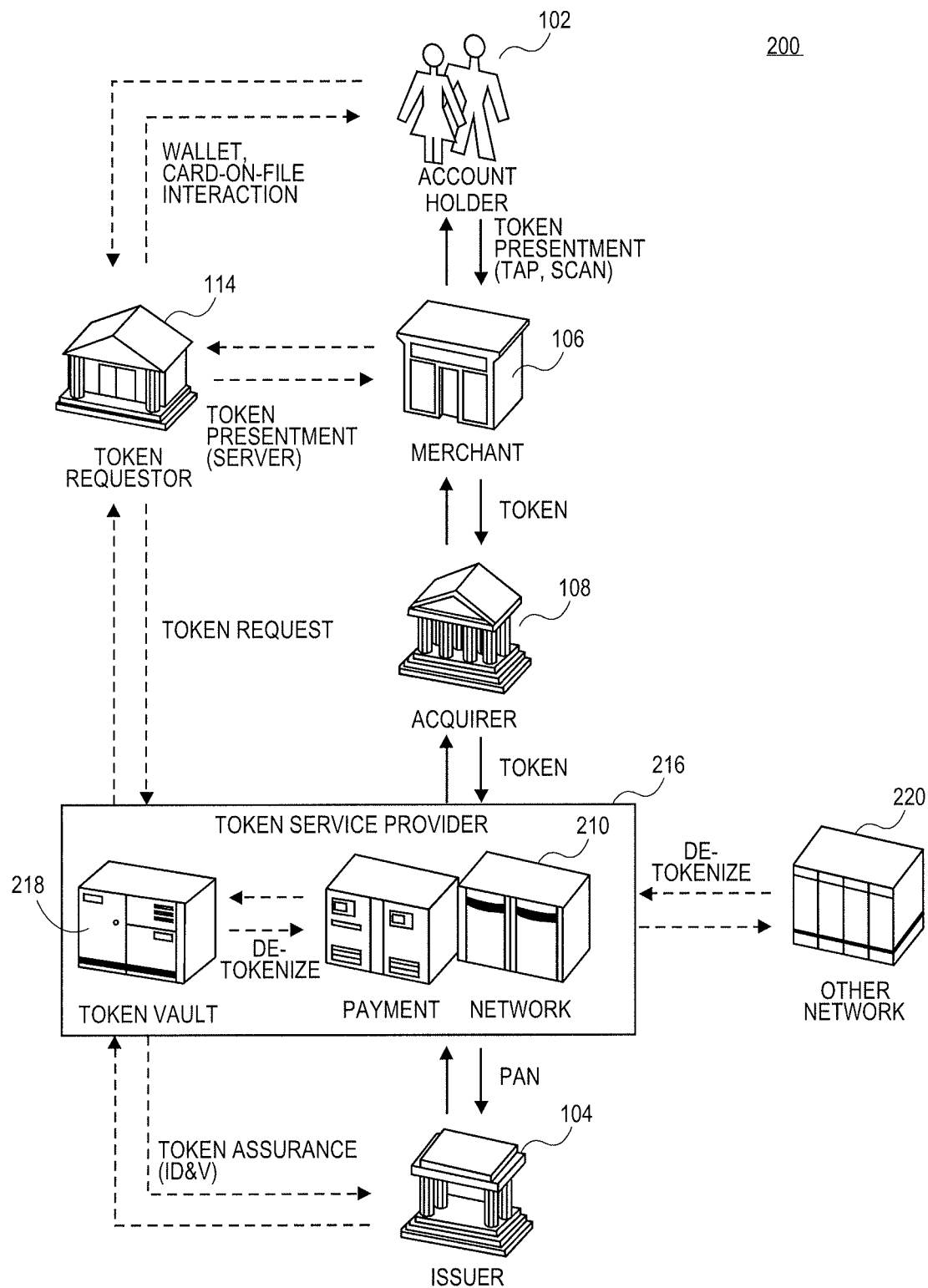
FIG. 2 shows a system and a flow diagram providing an overview of the various entity interactions in a tokenization ecosystem environment where a payment network serves as a token service provider, according to an exemplary embodiment of the present invention.

FIG. 2 shows a system and a flow diagram providing an overview of the various entity interactions in a tokenization ecosystem environment 200 where the payment network 210 serves as the token service provider 216, according to an exemplary embodiment of the present invention. Some of the entities illustrated in FIG. 2 are the same or similar to entities illustrated in FIG. 1. Detailed description of those entities is provided above in connection with FIG. 1 and, as such, will be omitted below.

As illustrated in FIG. 2, the account holder 102 may wish to conduct a payment transaction with the merchant 106. The account holder 102 may be able to initiate a transaction using a payment account identifier (e.g. a primary account number (PAN)). In addition, the account holder 102 may be capable to utilize a consumer device to initiate a transaction using any suitable transaction channel such as through a scan of a mobile device (e.g., using a QR™ code or bar code), a tap of a mobile device to a merchant access device (e.g., near-field communication (NFC) transaction or other contactless/proximity transaction), a click on a computer or other mobile device in order to initiate an e-commerce transaction (e.g., online transaction), or through any other channel in which a transaction may be initiated and a token may be passed to a merchant computer. For example, in some embodiments, a mobile device may be used to initiate a remote transaction with a token provisioned onto a secure element, other secure memory of the mobile device, or in "the cloud" such as with host card emulation.

If the account holder 102 is in possession of a payment device which includes a token representing the account number, the account holder 102 may present the token to the merchant 106 via scanning or tapping the payment device to a payment terminal of the merchant 106. If the account holder 102 is not in possession of the token, the account holder 102 (e.g. the payment device of the account holder 102) may contact a token requestor 114 to request a token.

Alternatively, the merchant 106 may contact (or become) the token requestor 114 to obtain a token for the transaction initiated or requested by the account holder 102.

The token requestor 114 may register with the token service provider 216 (i.e. the payment network 210 in FIG. 2) and may receive a token requestor identifier provided by the token service provider 216. The token service provider 216 may establish a process to register the entities that request to be designated as a token requestor 114. In some embodiments, entities that choose to be recognized as the token requestor 114 for multiple token service providers may register separately with each token service provider, according to the proprietary processes established by each token service provider. The token service provider 216 may determine the information to be collected from the token requestor 114 before registering the token requestor 114. The token service provider 216 may also establish its own proprietary processes for collection, review, and approval of the received information. Exemplary information collected from the token requestor 114 may include, but is not limited to, Know Your Customer (KYC) information, as well as token use cases that the enrolling token requestor may support, including any appropriate domain restrictions and other transactions controls, that may be implemented within the token vault 218. The outcome of the registration function is an approval or decline decision on the registration application of the prospective token requestor 114. If the token requestor 114 is approved by the token service provider 216, the token requestor 114 is assigned a unique token requestor ID.

Token requestor registration is a function that may ensure the integrity of the token service system 216 by enrolling, approving, and registering an entity as a token requestor 114. The token service provider 216 (i.e. the payment network 210 in FIG. 2) may assign at least a unique token requestor ID to the token requestor 114, and may be responsible for lifecycle management of the token requestor 114 and the associated token requestor ID. As part of the registration, the payment network 210 may also capture the requested token assurance level and token domain restriction controls associated with the token requestor 114. The payment network 210 may ensure that the domain restrictions are made available to the token vault 218 to apply the restrictions during token transaction processing.

The token requestor ID assigned by payment network 210 acting as the token service provider 216 may be unique and not conflict with other assigned token requestor IDs from the same payment network 210 or another token service provider. The token requestor ID may include an 11-digit numeric value assigned by the payment network 210 with the following exemplary convention: positions 1-3 may comprise a token service provider code, unique to each token service provider; and positions 4-11 may be assigned by token service provider for each requesting entity and token domain. The token service provider code may be assigned to each token service provider and maintained by the service provider or a collection of service providers that provide management, development, and maintenance of embodiments of the present invention. The token requestor ID is an underlying control data element that may be present in transactions discussed herein.

The token requestor 114 may specify configuration preferences or token attributes associated with the requested token. The configuration preferences or the token attributes may include, for example, token type (e.g., static or dynamic), supported token presentment modes (e.g., scan, contactless, e-commerce, etc.) and any other relevant token configuration information in a token request message. The token requestor 114 may send the token request message to the token service provider 216. Accordingly, the token request message may include token requestor ID, token attributes, token domain restriction controls, PAN to be represented (e.g. replaced) by the token and, optionally, a requested token assurance level.

The payment network 210 as the token service provider 216 is responsible for determining the expected level of assurance associated with each approved token requestor 114. The actual token assurance level may be determined at time of the token generation based on the type and outcome of the ID&V process. The actual token assurance level may be different than a requested token assurance level.

To ensure that tokens are used as intended by the token requestor 114, additional controls may be needed to manage and validate the underlying usage of the tokens. The controls may be defined and implemented by the payment network 210 as the token service provider 216 based on conditions, including use cases and token domains, such as merchant identifiers and token presentment modes that are identified during the token requestor registration process. The token domain controls may be intended to ensure that data leakage of tokens does not result in significant levels of subsequent fraud. The permitted token domain controls for a given token requestor 114 are driven in part by the token use cases specified at time of token requestor registration and approved by the payment network 210 as the token service provider 216. The domain restriction controls may be stored in the token vault 218.

Other controls that are designed to restrict transactions associated with the token requestor 114 may include the use of token presentment mode values that are carried in the POS Entry Mode data field of a payment authorization request message. The token presentment mode values may limit the use of tokens to only those token presentment modes agreed to during token requestor registration. For example, if the token requestor 114 has registered for a card-on-file use case, the payment network 210 may issue tokens with restricted usage by the token requestor ID and token presentment mode values that are indicative of e-commerce, so that only e-commerce transactions would be permitted to be processed by the payment network 210. In other embodiments, when the token presentment mode is a NFC point-of-sale presentment mode, the token usage may be restricted to only contactless chip POS Entry Mode values.

In embodiments where the merchant 106 is the token requestor 114, merchant-related data elements, such as the card acceptor ID in combination with acquirer-identifying data elements and token cryptogram, may be used to limit the use of a token by comparing or validating these fields in the transaction processing messages with controls established in the token vault 218 per information ascertained during token requestor registration. An exemplary embodiment may include tokenization of PANs held by card-on-file merchants.

Upon receiving the token request message from the token requestor 114, the payment network 210 may generate a token for the PAN provided in the token request message. The payment network 210 may inquire about the type of ID&V performed to confirm whether the person conducting the transaction is the legitimate account holder. Based on the type of ID&V performed and information about the entity performing the ID&V, the payment network 210 may also generate a token assurance level associated with the generated token. The token assurance level may represent a level of trust in an association between the generated payment token and the PAN represented by the payment token. The payment network 210 may store the association between the PAN and the generated token along with the token assurance level and the data used to generate the token assurance level in the vault 218. The payment network 210 may provide the token to the token requestor 114 in a token request reply message.

The token requestor 114 may present the token to the merchant 106, who may generate a payment authorization request message including the token. The merchant 106 may send the payment authorization request message to the acquirer 108, who may then pass the payment authorization request message to the payment network 210. If the token requestor ID is also passed to the merchant 106, the transaction may not be permitted to successfully process if the token requestor ID present in the payment authorization request message does not match the token requestor ID associated with the token in the token vault 218 or if the token cryptogram fails validation.

Upon receiving the payment authorization request message, the payment network 210 may interact with the token vault 218 and/or other network server(s) 220 to de-tokenize the token provided in the payment authorization request message. Specifically, the payment network 210 may retrieve the PAN represented by the token as a result of the de-tokenization process. The payment network 210 may then modify the payment authorization request message to include the PAN along with (or instead of) the token, as well the token assurance level and the data used to generate the token assurance level. The payment network 210 may send the modified payment authorization request message to the issuer 104.

The issuer 104, upon receiving the PAN, the token representing the PAN, the token assurance level and the data used in generating the token assurance level in a payment authorization request message, may perform account-level validation and authorization check. The issuer 104 may send a payment authorization response message to the payment network 210 approving or declining the payment transaction. The payment authorization response message may include the PAN, the token, the token requestor information or token requestor ID, the token domain restriction controls, the token assurance level and the data used to generate the token assurance level, among other data. The payment network 210 may modify the payment authorization response message to replace the PAN with the token. In some embodiments, the payment network 210 may include the token assurance level in the payment authorization response message but may remove the data used in generating the token assurance level. The contents of the payment authorization request message and the payment authorization response message are discussed below in greater detail in connection with exemplary use cases. The payment network 210 may send the payment modified authorization response message to the merchant 106 via the acquirer 108. Based on the authorization response message, the merchant 106 may finalize the transaction with the account holder 102.

II. Exemplary Use Cases

Figure 6:
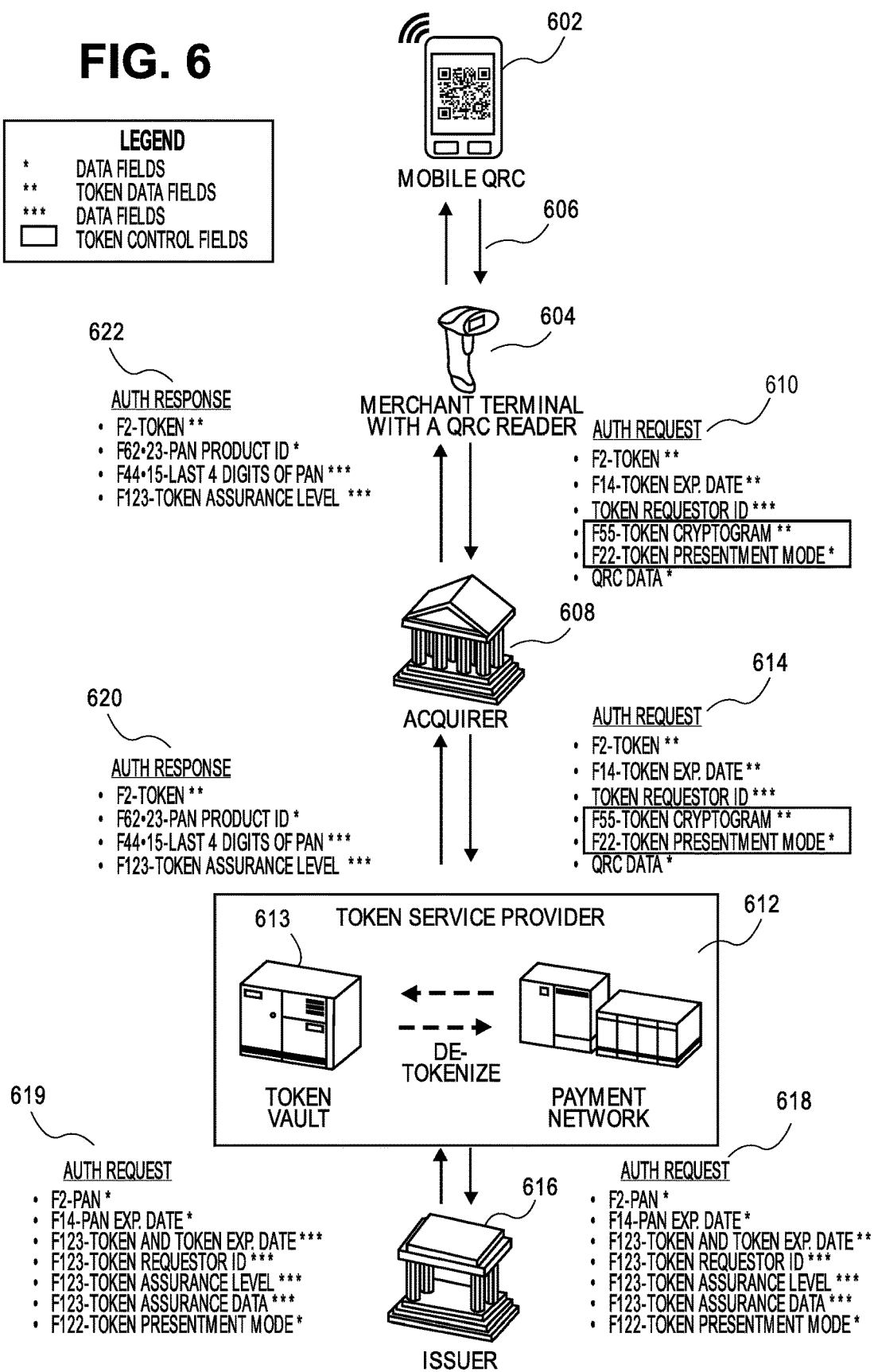
FIG. 6 shows a system and a flow diagram for an authorization flow for a scan at a merchant terminal transaction, according to an exemplary embodiment of the present invention.
Figure 7:
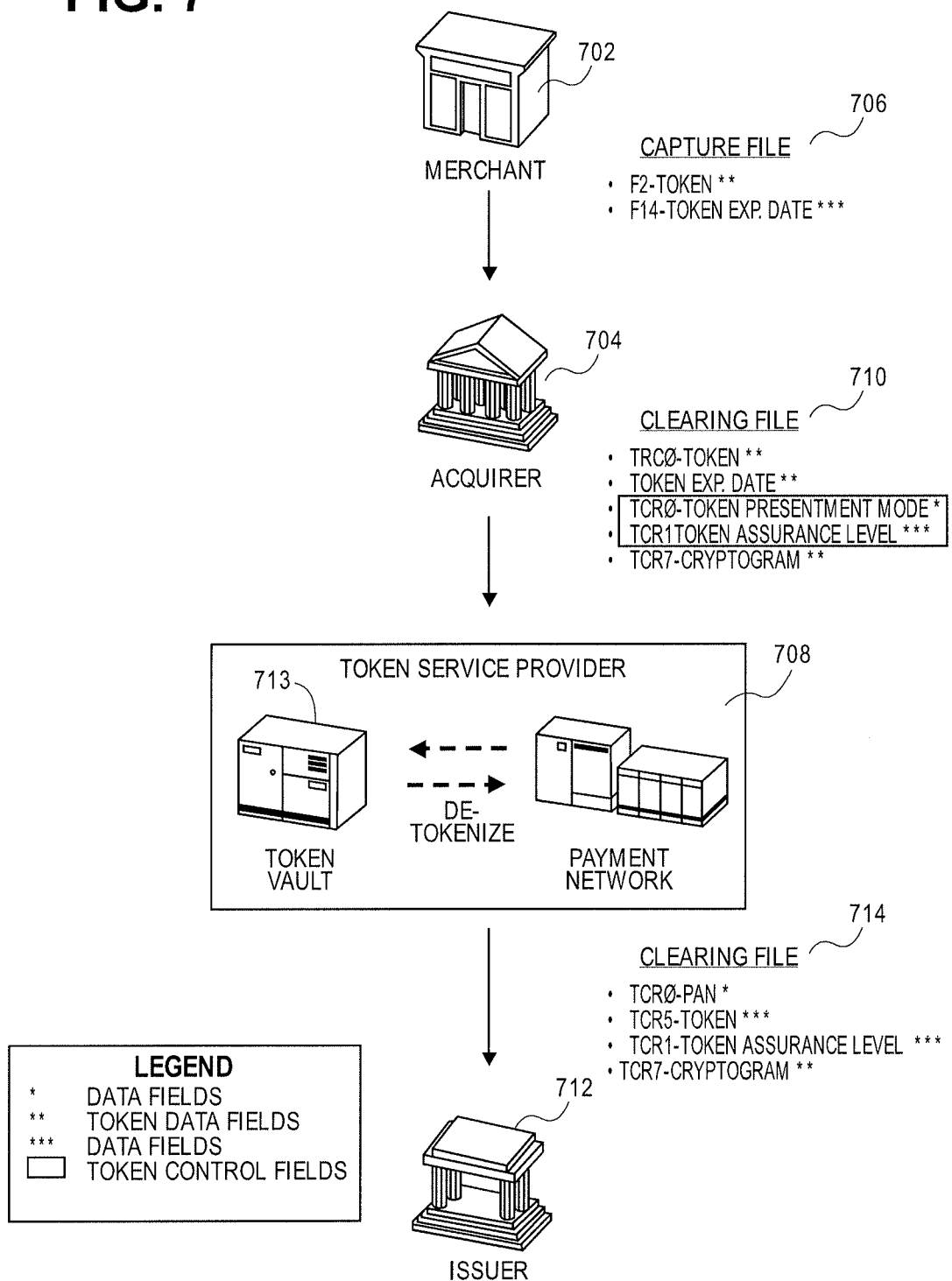
FIG. 7 shows a system and a flow diagram for a capture and clearing process for a token transaction, according to an exemplary embodiment of the present invention.
Figure 8:
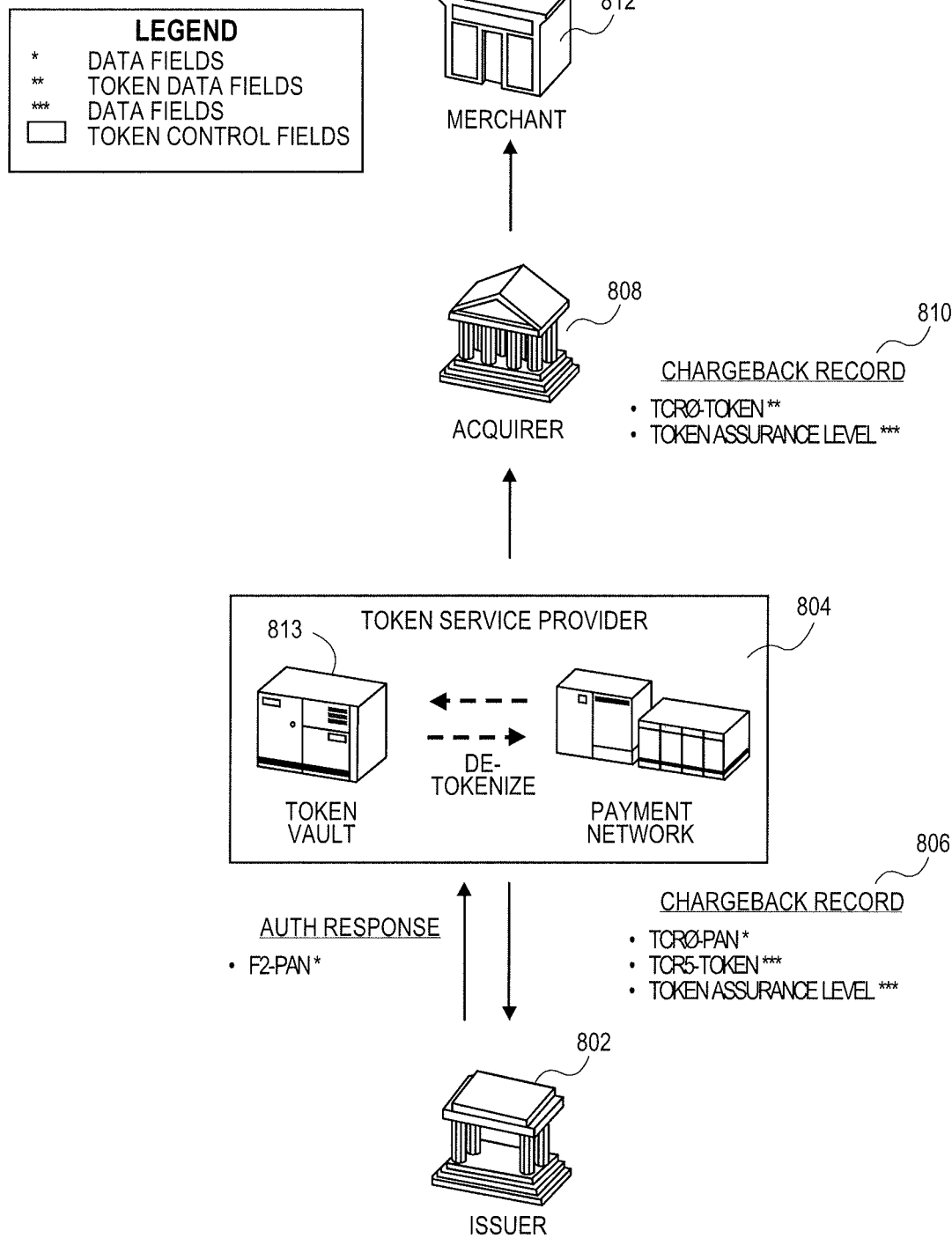
FIG. 8 shows a system and a flow diagram for a chargeback request process for a token transaction, according to an exemplary embodiment of the present invention.

This section provides descriptions and diagrams of token transaction flows for exemplary use cases presented in FIGS. 3-8. The exemplary use cases defined in embodiments of the present invention include mobile near field communications (NFC) at point of sale (FIG. 3), mobile/digital wallet electronic commerce (FIG. 4), card-on-file electronic commerce (FIG. 5), scan at point of sale (FIG. 6), clearing and capture processing (FIG. 7), and exception processing (FIG. 8). Accordingly, FIGS. 3-8 identify some of the data elements that may be present in authorization, capture, clearing, and exception processing transactions, depending on the use case and the data element.

The implementation of a token service based on embodiments of the present invention may include the passing of token-related data in data fields of messages, as indicated in FIGS. 3-8. In the exemplary embodiments illustrated in FIGS. 3-8, the payment network acts as the token service provider. However, the present invention is not limited to the exemplary embodiments illustrated in FIGS. 3-8. For example, as provided above, other entities of the tokenization ecosystem environment may act as the token service provider. Embodiments ensure that when the payment network acts as the token service provider, the payment network can recognize token transactions in order to map the tokens to PANs during transaction processing.

Use Case 1: Mobile NFC at Point of Sale

Figure 3:
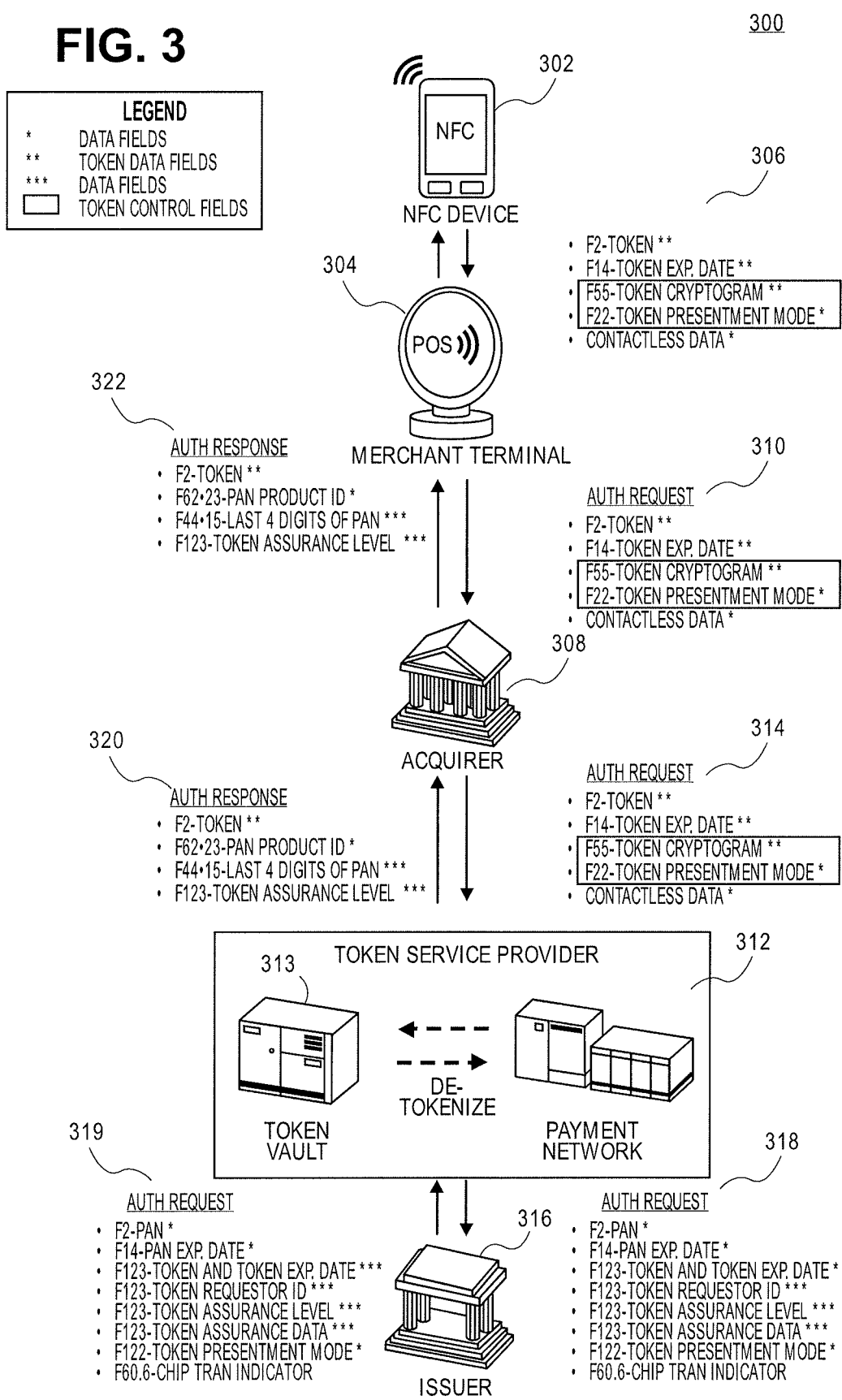
FIG. 3 shows a system and flow diagram for an authorization flow for a mobile device at a merchant terminal transaction, according to an exemplary embodiment of the present invention.

Referring now to FIG. 3, the mobile NFC at point-of-sale use case 300 refers to using a NFC-enabled mobile device 302 to initiate contactless payment at a merchant terminal 302. The mobile device 302 may be provisioned with a token that is stored within a secure memory, such as a secure element, of the mobile device 302. According to various embodiments, the token provisioning may be accomplished by the token requestor interfacing with the token service provider, as discussed above.

When a transaction is initiated, the mobile device 302 may generate a contactless transaction 306 including the token, token expiry date, token cryptogram, and other chip data elements. These data elements may be included in the contactless transaction 306 at dedicated data fields, as illustrated in FIG. 3. According to various embodiments, the mobile device 302 may pass the token data elements to the merchant terminal 304 as follows: token may be passed in the PAN data field F2; token expiry date may be passed in the PAN expiry date data field F14; token cryptogram may be generated based on the token data elements and may be passed in the chip cryptogram data field F55; token presentment mode may be set to a POS entry mode for contactless transactions in data field F22; and all other contactless data elements may be created and passed following typical contactless communications. The token cryptogram generated from the mobile device 302 may serve as the domain restriction control field that may be used by the token service provider to validate the integrity of the transaction using the token.

The mobile device 302 may pass the contactless transaction 306 including the foregoing data fields to the merchant point-of-sale terminal 304 via an NFC interface. The merchant terminal 304 may send an authorization request message 310 to the acquirer 308. The authorization request message 310 sent by the merchant terminal 304 to the acquirer 308 may include the same data elements as the contactless transaction 306 sent by the mobile device 302 to the merchant terminal 304.

Upon receiving the authorization request message 310, the acquirer 308 may perform processing checks and pass the token data fields and the contactless data to the payment network 312 acting as the token service provider. The authorization request message 314 sent by the acquirer 308 to the payment network 312 may include the same data elements as the authorization request message 310 and the contactless transaction 306.

The payment network 312 acting as the token service provider, may process the token transaction. The processing may include interfacing (or interacting) with the token vault 313 to retrieve the PAN represented by the received token. The payment network 312 may verify the state of token-to-PAN mapping in the token vault 313 to ensure that the token is in an active state. The payment network 312 may validate the token cryptogram received in the authorization request message 314. The payment network 312 may also validate the domain restriction controls stored in the token vault 313 for the received token. The payment network 312 may also retrieve from the token vault 313 the token assurance level and data used in generating the token assurance level associated with the received token. The payment network 312 may then modify the authorization request message 314 to generate a modified authorization request message 318. In the modified authorization message, the token may be replaced with the PAN in data field F2; the token expiry date may be replaced with the PAN expiry date in data field F14; POS Entry Mode may be passed in data field F22; an indicator may be included in in data field F60.6 to convey to the issuer that an on-behalf-of validation has been completed by the token service provider of the token; a product ID may be passed in data field F62.23; and various token-related fields may be included. For example, the token-related fields may include the token passed in data field F123-DSI 68 Tag1, the token expiry date, the token assurance level passed in data field F123-DSI 68 Tag2, the token assurance data, and the token requestor ID passed in data field F123-DSI 68 Tag3. Upon generating the modified authorization request message 318, the payment network 312 may send the modified authorization request message 318 to the issuer 316.

The data fields illustrated herein are provided for illustration purposes only and should not be construed as limiting. Same or similar information may be transmitted in different data fields. For example, the token requestor ID may be passed in data element 48 sub-element 33 subfield 6, the product code may be passed in data element 48 sub-element 33 subfield 4, and the token assurance level in data element 48 sub-element 33 subfield 5. These and any other data fields used to pass the information discussed herein are within the scope of the present invention.

The issuer 316 may complete an account-level validation and authorization check using the information provided in the modified authorization request message 318. The issuer may send an authorization response message 319 to the payment network 312. For example, the issuer 316 may pass the token information to the payment network 312 in pre-determined data fields of the authorization response message 319. The issuer 316 may pass the PAN in data filed F2, the product ID in data field F62.23 and the token in data field F123-DSI 68 Tag1.

Upon receiving the authorization response message 319 from the issuer 316, the payment network 312 may modify the authorization response message 319 by replacing the PAN with the token based on the mapping. The payment network 312 may generate a modified authorization response message 320 including data elements such as one or more of the token in data filed F2, the token assurance level in data field F123-DSI 68 Tag2, the last 4 digits of PAN in data field F44.15 and the PAN product ID in data field 62.23. The payment network 312 may send the modified authorization response message 320 to the acquirer 308. The acquirer 308 may then pass an authorization response message 322 to the merchant terminal 304. The authorization response message 322 may include the same data fields as the modified authorization response message 320.

The authorization response message 319 and the modified authorization response messages 320 and 322 may indicate whether the issuer 316 approved the transaction initiated by the account holder using the mobile device 302. After the authentication response message 322 is provided to the merchant terminal 304, the account holder may be notified of the success or failure of the transaction.

Use Case 2: Mobile/Digital Wallet Electronic Commerce

Figure 4:
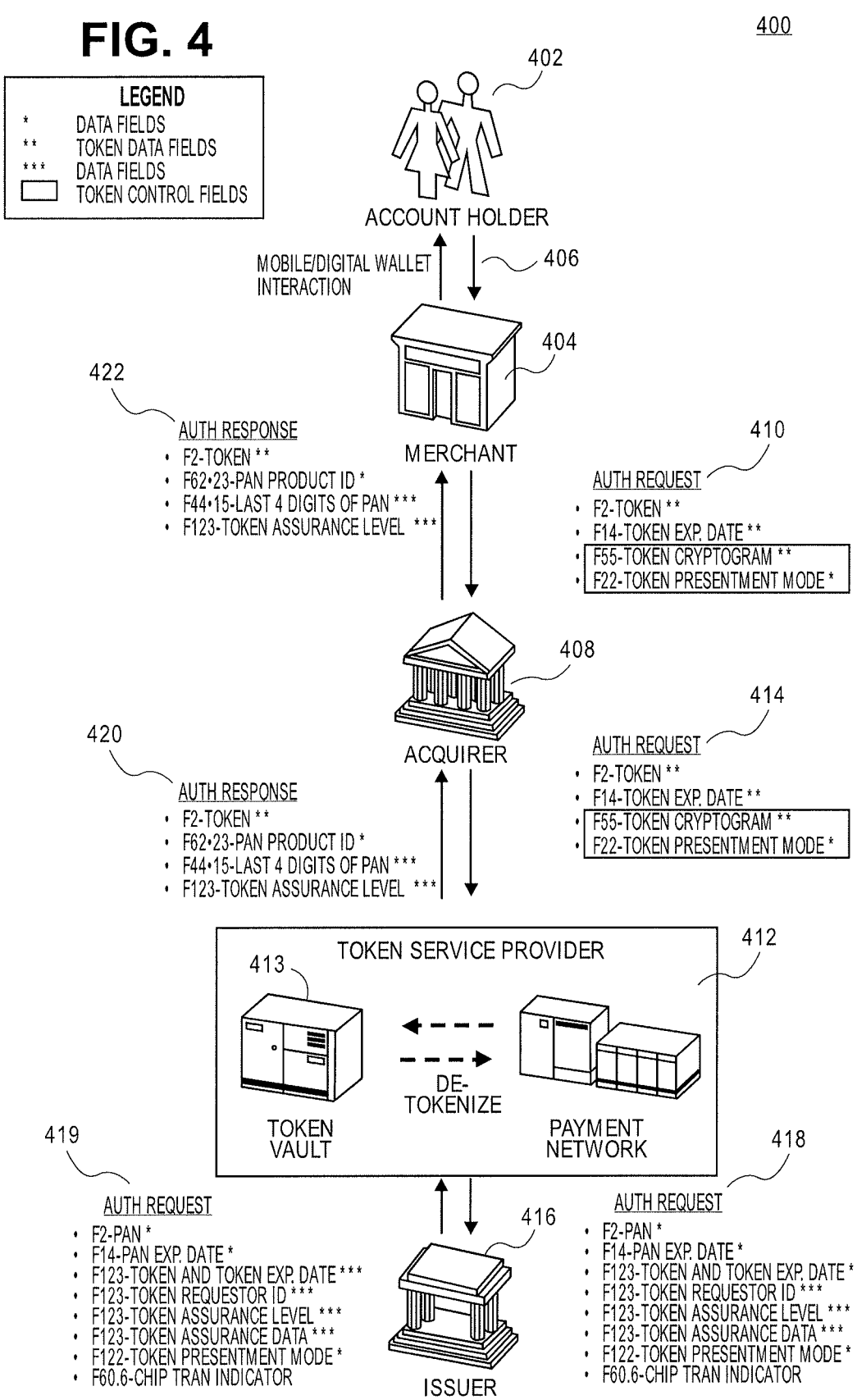
FIG. 4 shows a system and a flow diagram for an authorization flow for a mobile/digital wallet e-Commerce transaction, according to an exemplary embodiment of the present invention.

Referring now to FIG. 4, in the mobile/digital wallet electronic commerce use case 400, an account holder 402 initiates a payment transaction to an e-commerce site using a mobile/digital wallet to transfer payment and other order information to the merchant-owner 404 of the e-commerce site. The mobile/digital wallet may be operated by the issuer 416, the payment network 412 or other third parties. According to various embodiments, the digital wallet operator may be the token requestor.

In FIG. 4, the wallet operator may already have provided for tokenization so as to no longer store the PAN in the wallet platform for security or other rationales. When the account holder 402 initiates a payment transaction at the e-commerce merchant 404 that operates with the wallet in use, the wallet may pass a payment transaction request message 406 including a token in lieu of the PAN and other order information (e.g., shipping address) to the merchant 404 via the wallet API.

When a transaction is initiated, a merchant application/digital wallet in a mobile device of the account holder 402 may interact with a payment application to pass data elements to the merchant 404 in a payment transaction request message 406. The payment transaction request message 406 may transmit a token in the PAN field of the message, a token expiry date in the PAN expiry date data field of the message, a token cryptogram may be optionally generated based on the token data elements and passed in the token cryptogram field of the message and a token presentment mode in the POS Entry Mode (as an electronic commerce transaction) field of the message. The payment transaction request message 406 may also include a token requestor ID in an optional field of the message, as well as other data elements. In some embodiments, the payment transaction request message 406 may include the same data fields as the contactless transaction 306 illustrated in FIG. 3.

The merchant terminal 404 may generate and send an authorization request message 410 to the acquirer 408, carrying the token data fields. The authorization request message 410 sent by the merchant terminal 404 to the acquirer 408 may include the same data elements as the payment transaction request message 406. Specifically, the authorization request message 410 may include the token in the PAN field; token expiry date in the PAN expiry date data field; token cryptogram in the chip cryptogram field; the token requestor ID in an optional data field; and the token presentment mode may be set to a POS entry mode for an electronic commerce transaction.

Upon receiving the authorization request message 410, the acquirer 408 may process checks and pass the token data fields to the payment network 412 acting as the token service provider. The authorization request message 414 sent by the acquirer 408 to the payment network 412 may include the same data elements as the authorization request message 410.

The payment network 412 acting as the token service provider, may process the transaction. The processing may include interfacing (or interacting) with the token vault 413 to retrieve the PAN represented by the received token. The payment network 412 may verify state of the token-to-PAN mapping in the token vault 413 to ensure that the token is in an active state. The payment network 412 may validate the token cryptogram, when a cryptogram is received in the authorization request message 414. The payment network 412 may also validate the domain restriction controls stored in the token vault 413 for the received token. The payment network 412 may also retrieve from the token vault 413 the token assurance level and data used in generating the token assurance level associated with the received token. The payment network 412 may then modify the authorization request message 414 to generate a modified authorization request message 418. In the modified authorization message, the token may be replaced with the PAN; the token expiry date may be replaced with the PAN expiry date; an indicator may be added to convey to the issuer that an on-behalf-of validation has been completed by the token service provider of the token; and the token-related fields may be passed in the authorization request message. The token-related fields may include the token, token expiry date, token assurance level, token assurance data, and token requestor ID. Upon generating the modified authorization request message 418, the payment network 412 may send the modified authorization request message 418 to the issuer 416.

The issuer 416 may complete an account-level validation and authorization check using the information provided in the modified authorization request message 418. The issuer may send an authorization response message 419 to the payment network 412. Upon receiving the authorization response message 419 from the issuer 416, the payment network 412 may modify the authorization response message 419 by replacing the PAN with the token based on the mapping. The payment network 412 may generate a modified authorization response message 420 including data elements such as one or more of the token, the token assurance level, last 4 digits of PAN and PAN product ID. The payment network 412 may send the modified authorization response message 420 to the acquirer 408. The acquirer which may then pass an authorization response message 422 to the merchant terminal 404. The authorization response message 422 may include the same data fields as the modified authorization response message 420.

The authorization response message 419 and the modified authorization response messages 420 and 422 may indicate whether the issuer 416 approved the transaction initiated by the account holder 402. After the authentication response message 422 is provided to the merchant terminal 404, the account holder may be notified of the success or failure of the transaction.

Use Case 3: Card-On-File Electronic Commerce

Figure 5:
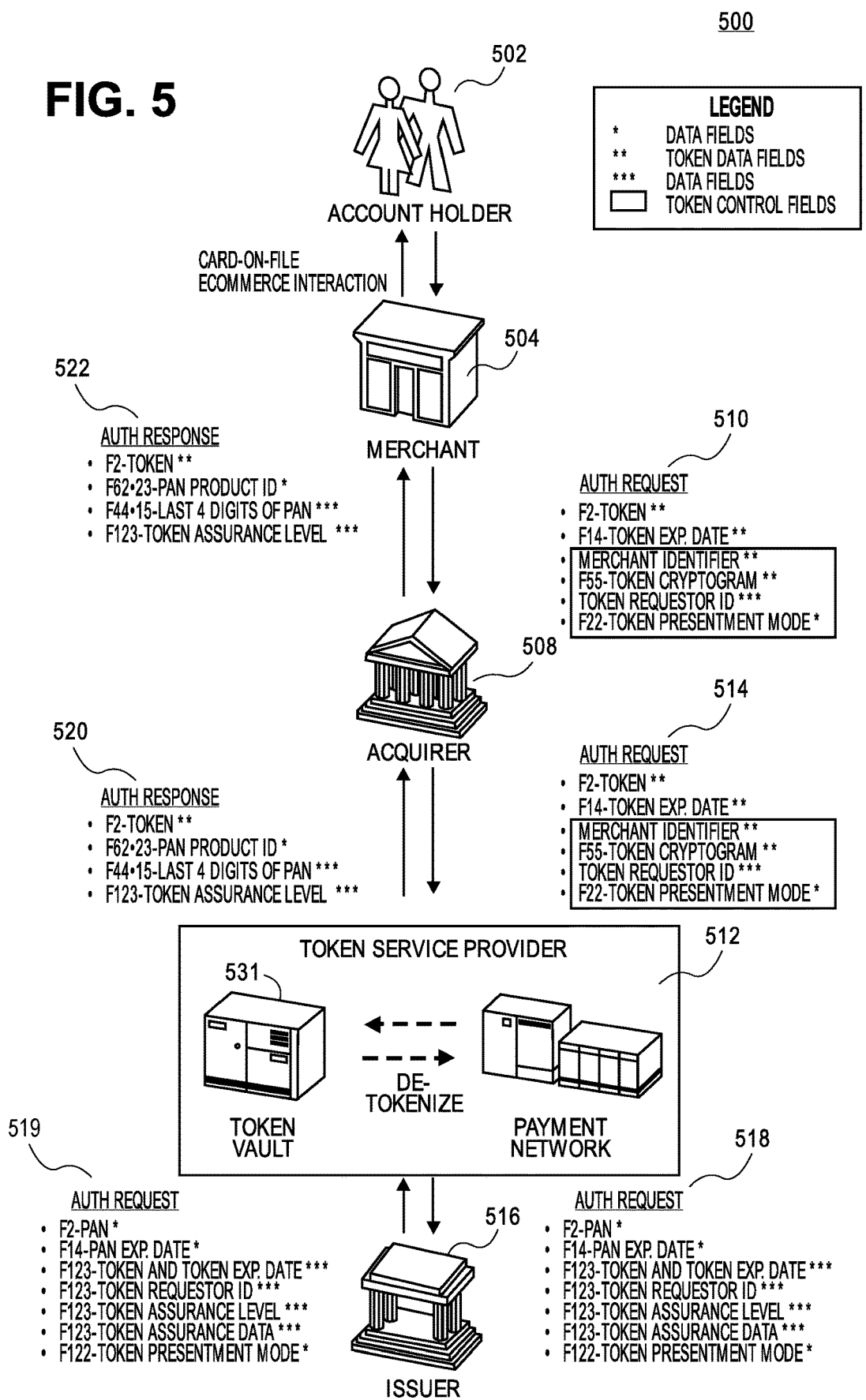
FIG. 5 shows a system and a flow diagram for an authorization flow for a card-on-file e-Commerce transaction, according to an exemplary embodiment of the present invention.

Referring now to FIG. 5, a card-on-file electronic commerce use case 500 is illustrated. In FIG. 5, an e-commerce merchant 504 that has payment account data (e.g. PAN and PAN expiry date) already stored on file in a database may seek to remove the underlying security exposure of storing the data by replacing the PAN with a token. Accordingly, in embodiments related to card-on-file e-commerce transactions, the merchant 504 may be the token requestor. Once the token is returned to the card-on-file merchant 504, all subsequent e-commerce transactions that are processed may include the token and the token expiry date (carried in the PAN and PAN expiry date data fields) in the transaction messages passed in the tokenization ecosystem environment.

To initiate a payment transaction, the account holder 502 may log in with the card-on-file merchant 504 and initiate an e-commerce purchase on a merchant website. The merchant website may pass token data elements to a merchant platform (e.g. a merchant server 504) in dedicated fields of a payment transaction request message. According to various embodiments, the merchant website may pass the token data elements to the merchant server 504 as follows: the token may be passed in the PAN field of the payment transaction request message, the token expiry date may be passed in the PAN expiry date field of the message, a merchant identifier may be passed in a data field, the token presentment mode may be set to the POS Entry Mode for e-commerce transactions, the token requestor ID may be passed in an optional field of the message, the token cryptogram may be an optional data element that may be generated based on the token data fields and passed in an optional data field of the message. All other merchant identifiers may be created and passed along in the payment transaction request message. According to various embodiments, the token requestor ID and related merchant identifiers may serve as the domain restriction control fields that may be used to validate the integrity of the transaction.

The merchant server 504 may generate and send an authorization request message 510 to the acquirer 508, carrying the token data fields. Accordingly, the authorization request message 510 sent by the merchant terminal 504 to the acquirer 508 may include the same data elements as the payment transaction request message sent by the merchant website to the merchant server 504.

Upon receiving the authorization request message 510, the acquirer 508 may perform processing checks and pass the token data fields to the payment network 512 acting as the token service provider. The authorization request message 514 sent by the acquirer 508 to the payment network 512 may include the same data elements as the authorization request message 510.

The payment network 512 acting as the token service provider, may process the token transaction. The processing may include interfacing (or interacting) with the token vault 513 to retrieve the PAN represented by the received token. the payment network 512 may verify the state of the token-to-PAN mapping in the token vault 513 to ensure that the token is in an active state. The payment network 512 may validate the token cryptogram received in the authorization request message 514. The payment network 512 may also validate the domain restriction controls stored in the token vault 513 for the received token. The payment network 512 may also retrieve the token assurance level and data used in generating the token assurance level associated with the received token from the token vault 513. The payment network 512 may then modify the authorization request message 514 to generate a modified authorization request message 518. In the modified authorization message, the token may be replaced with the PAN; the token expiry date may be replaced with the PAN expiry date; an indicator may be added to convey to the issuer that an on-behalf-of validation has been completed by the token service provider of the token; and the token-related fields may be passed in the authorization request message. The token-related fields may include the token, token expiry date, token assurance level, token assurance data, and token requestor ID. Upon generating the modified authorization request message 518, the payment network 512 may send the modified authorization request message 518 to the issuer 516.

The issuer 516 may complete an account-level validation and authorization check using the information provided in the modified authorization request message 518. The issuer may send an authorization response message 519 to the payment network 512. Upon receiving the authorization response message 519 from the issuer 516, the payment network 512 may modify the authorization response message 519 by replacing the PAN with the token based on the mapping. The payment network 512 may generate a modified authorization response message 520 including data elements such as one or more of the token, the token assurance level, last 4 digits of PAN and PAN product ID. The payment network 512 may send the modified authorization response message 520 to the acquirer 508. The acquirer which may then pass an authorization response message 522 to the merchant terminal 504. The authorization response message 522 may include the same data fields as the modified authorization response message 520.

The authorization response message 519 and the modified authorization response messages 520 and 522 may indicate whether the issuer 516 approved the transaction initiated by the account holder using the mobile device 502. After the authentication response message 522 is provided to the merchant terminal 504, the account holder may be notified of the success or failure of the transaction.

Use Case 4: Scan at Point of Sale

Referring now to FIG. 6, a mobile quick response code (QRC) at point-of-sale use case is illustrated. In FIG. 6, the mobile device 602 may initiate a QRC-based payment at a merchant location using a QRC reader 604. In some embodiments, an application in the mobile device 602 may generate a dynamic QRC every time a payment is initiated in a secure manner. When a transaction is initiated, the mobile device 602 may generate a transaction request message 606 including the token, token expiry date, and token cryptogram elements, and any other data from the QRC, and pass the transaction request message 606 to the merchant terminal 604.

When a transaction is initiated, the mobile device 602 may interact with the merchant terminal 604 that is enabled to read QRC and pass data elements to the merchant terminal 604 in a payment transaction request message 606. The payment transaction request message 606 may transmit a token in the PAN field of the message, a token expiry date in the PAN expiry date data field of the message, QRC data in a data field of the message, a token cryptogram may be optionally generated based on the token data elements and passed in the token cryptogram data field of the message and a token presentment mode in the POS Entry Mode (as QRC-based transaction) data field of the message. The payment transaction request message 606 may also include a token requestor ID in an optional field of the message, as well as other data elements. The token cryptogram may be optionally generated from the mobile device 602 and may serve as the domain restriction control field that may be used by the token service provider to validate the integrity of the transaction using the token.

The merchant terminal 604 may generate and send an authorization request message 610 to the acquirer 608, carrying the token data fields. The authorization request message 610 sent by the merchant terminal 604 to the acquirer 608 may include the same data elements as the payment transaction request message 606. Specifically, the authorization request message 610 may include the token in the PAN field; token expiry date in the PAN expiry date field; token cryptogram in the chip cryptogram field; the token requestor ID in an optional data field; the token presentment mode may be set to a POS entry mode for a QRC-based transaction and QRC data.

Upon receiving the authorization request message 610, the acquirer 608 may perform processing checks and pass the token data fields to the payment network 612 acting as the token service provider. The authorization request message 614 sent by the acquirer 608 to the payment network 612 may include the same data elements as the authorization request message 610.

The payment network 612 acting as the token service provider, may process the token transaction. The processing may include interfacing (or interacting) with the token vault 613 to retrieve the PAN represented by the received token. The payment network 612 may verify the state of the token-to-PAN mapping in the token vault 613 to ensure that the token is in an active state. The payment network 612 may validate the token cryptogram if a cryptogram is received in the authorization request message 614. The payment network 612 may also validate the domain restriction controls stored in the token vault 613 for the received token. The payment network 612 may also retrieve the token assurance level and data used in generating the token assurance level associated with the received token from the token vault 613. The payment network 612 may then modify the authorization request message 614 to generate a modified authorization request message 618. In the modified authorization message 618, the token may be replaced with the PAN; the token expiry date may be replaced with the PAN expiry date; an indicator may be added to convey to the issuer that an on-behalf-of validation has been completed by the token service provider of the token; and the token-related fields may be passed in the authorization request message. The token-related fields may include the token, token expiry date, token assurance level, token assurance data, and token requestor ID. Upon generating the modified authorization request message 618, the payment network 612 may send the modified authorization request message 618 to the issuer 616.

The issuer 616 may complete an account-level validation and authorization check using the information provided in the modified authorization request message 618. The issuer may send an authorization response message 619 to the payment network 612. Upon receiving the authorization response message 619 from the issuer 616, the payment network 612 may modify the authorization response message 619 by replacing the PAN with the token based on the mapping. The payment network 612 may generate a modified authorization response message 620 including data elements such as one or more of the token, the token assurance level, last 4 digits of PAN and PAN product ID. The payment network 612 may send the modified authorization response message 620 to the acquirer 608. The acquirer which may then pass an authorization response message 622 to the merchant terminal 604. The authorization response message 622 may include the same data fields as the modified authorization response message 620.

The authorization response message 619 and the modified authorization response message 620 (and 622) may indicate whether the issuer 616 approved the transaction initiated by the account holder 602. After the authentication response message 622 is provided to the merchant terminal 604, the account holder may be notified of the success or failure of the transaction.

Capture and Clearing Flow

Capture processing may refer to transferring funds from an account holder to a merchant. Clearing may refer to the process of transmitting, reconciling and confirming funds resulting from payment transactions. During the clearing flow, clearing messages may be passed from the acquirer to payment network, and from the payment network to the issuer. The clearing process defined in embodiments of the present invention may be implemented by a clearing system operated by, for example, the payment network.

FIG. 7 illustrates an exemplary capture and clearing process for a token transaction. According to various embodiments, a merchant 702 may generate a capture file 706 based on the information provided by a consumer (e.g. an account holder) during transaction initiation. The capture file 706 may include the token in the PAN data field F2 and the token expiry date in the PAN expiry date data field F14. The merchant 702 may send capture file 706 to the acquirer 704.

The acquirer 704 may process checks on the data elements of the capture file 406. The acquirer 704 may create a clearing file 710 to be sent to the payment network 708 acting as the token service provider. The clearing file 710 may include the token in the PAN field TCR0, the token expiry date in the PAN expiry date data filed, the token presentment mode set to the POS entry mode for the channel-specific transaction in the data field TCR0, and the token assurance level in a new data field TCR1 that may be introduced for token transactions. In some embodiments, the clearing file 710 may also include a cryptogram in a data field TCR7 of the file.

When the payment network 708 receives the clearing file 710, the payment network 708 may interface with the token vault 713 to retrieve the PAN corresponding to the received token. The payment network 708 may verify the state of token-to-PAN mapping in the token vault 713 to ensure that the token is in an active state. If a cryptogram is included in the clearing file 710, the payment network 708 may validate the cryptogram. The payment network 708 may also validate the domain restriction controls stored in the token vault 713 for the received token.

The payment network 708 may then modify the clearing file 710 to generate a modified clearing file 714. In the modified clearing file 714, the token may be replaced with the PAN in data field TCR0; an indicator may be added to convey to the issuer that an on-behalf-of validation has been completed by the token service provider of the token; and the token-related fields may be passed in the authorization request message. The token-related fields may include the token in data field TCR5 and the token assurance level in data field TCR1. In some embodiments, a cryptogram may be included in data field TCR7 of the modified clearing file 714. Upon generating the modified clearing file 714, the payment network 708 may send the modified clearing file 714 to the issuer 712.

The issuer 712 may complete an account-level validation using the information provided in the modified clearing file 714 and complete the clearing process.

Exception Flow

The exception processing may refer to messages flowing in the tokenization ecosystem environment related to chargeback requests and/or to payments that could not have been processed due to, for example, missing funds or missing customer/payment/transaction information. In some embodiments where the exception processing refers to chargeback processing, the chargeback messages may flow from an issuer to a payment network, and from the payment network to an acquirer.

FIG. 8 illustrates an exemplary token processing flow for a chargeback request and chargeback data elements. According to various embodiments, an issuer 802 may file for a chargeback after validating that the original transaction is a valid chargeback request, and that the issuer 802 has the appropriate chargeback rights. A chargeback record file 806 may be generated by the issuer 802 and sent to the payment network 804. The chargeback record file 806 may include, among other data elements, the PAN (that was used in the original purchase transaction) in data field TCR0, the token corresponding to the PAN in an data field TCR5, the token assurance level retrieved from the token vault 813 in data field, and the token requestor ID may be passed in an optional field in the chargeback record file 806.

When the payment network 804 receives the chargeback record file 806, the payment network 804 may verify the state of token-to-PAN mapping in the token vault 813 to ensure that the token is in an active state. If the token is not included in the chargeback record file 803 sent by the issuer 802, the payment network 804 may retrieve the token for the transaction that is being disputed from the token vault 813. The payment network 804 may then generate a modified chargeback record file 810 to be sent to the acquirer 808. The modifications implemented by the payment network 804 to generate the modified chargeback record file 810 may include replacing the PAN with the corresponding token and optionally including one or more token-related fields in the modified chargeback record file 810, such as the token requestor ID and the token assurance level.

Upon receiving the modified chargeback record file 810, the acquirer 808 may perform validation on the modified chargeback record file 810, and based on the investigation of the case, may move to another phase of dispute handling or, alternatively, may resolve the chargeback.

III. Token Service Provider Application Program Interfaces (APIs)

Figure 9:
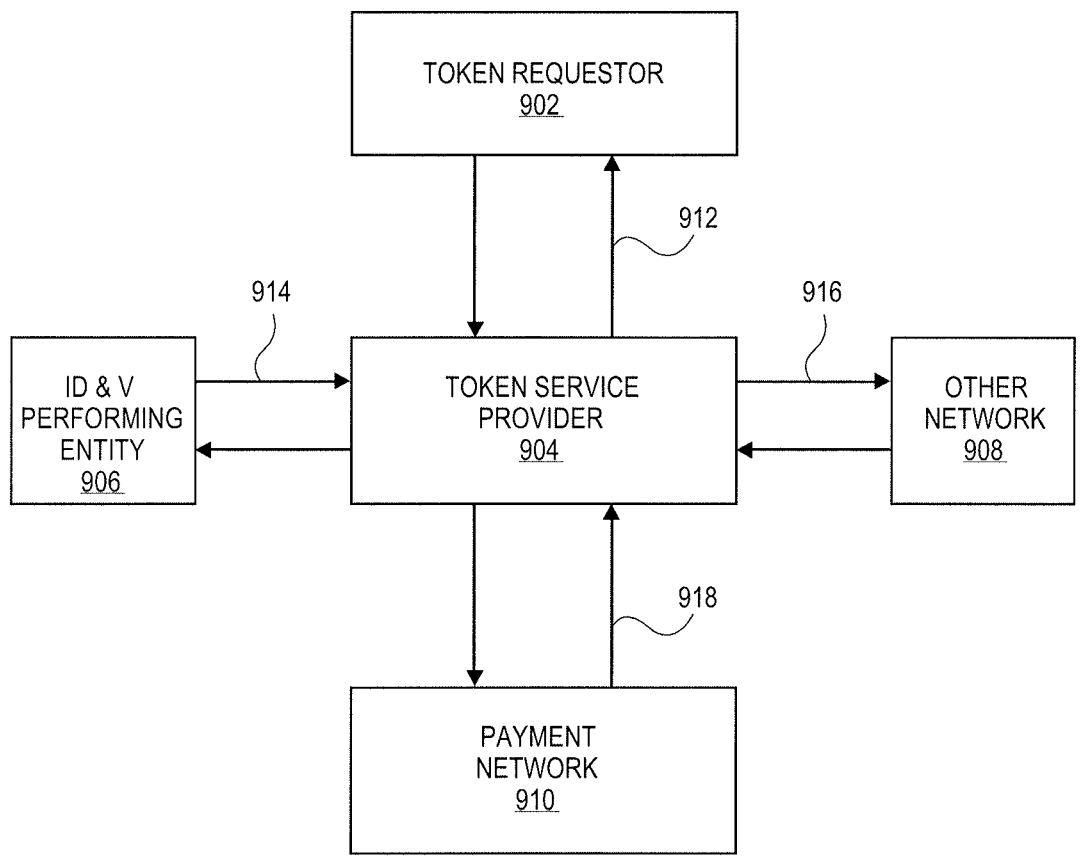
FIG. 9 shows a diagram providing an overview of the various roles involved in implementing a token service, according to an exemplary embodiment of the present invention.

FIG. 9 illustrates the use of Application Program Interfaces (APIs) by the token service provider to facilitate token issuance and processing (e.g. to provide a token service).

Embodiments of the present invention describe the interaction between the token service provider 904 and other entities in a tokenization ecosystem environment 900 through the use of one or more APIs and/or messaging interface(s) to facilitate token requests, token issuance, ID&V performance, de-tokenization, token routing, and token lifecycle management. Accordingly, embodiments of the present invention establish the common data elements for the interfaces that a token service provider 904 may support. According to some embodiments, the interfaces discussed herein may be implemented and made available by the token service provider 904 to be used by all participating entities that interact with the token service provider 904.

The token service provider 904 may provide the capability to establish and use interfaces or APIs with the entities that are authenticated through a secured method of interaction with the token service provider 904. For example, the interactions may occur through authenticated methods including, but not limited to, Web services, ISO 8583 message exchange through an existing payment network interface, and file/batch. One or more of the entities in the tokenization ecosystem environment 900, such as a token requestor 902, an entity performing ID&V 906, other networks 908, a payment network 910 may use the token service interfaces.

The interfaces may be classified as token request and issuance interface(s) 912, token assurance (e.g. ID&V) interface(s) 914, de-tokenization interface(s) 916, token routing interface(s) 918, and token lifecycle management interface(s). The one or more defined interfaces may enable transfer of messages to carry out a specific token-related operation.

Token Request and Issuance Interface(s)

As discussed above, the token service provider 904 may provide an interface 912 that a registered token requestor 902 can use to submit a token request message including original payment credentials and receive a token response message including a token from the token service provider 904. The token request message and the token response message may be passed between the token requestor 902 and the token service provider 904 through the token request and issuance interface 912.

The token request and issuance interface 912 may support real-time requests for issuance of a token for the PAN requested, or in-bulk requests through a secure interface file where the tokens are generated and issued in bulk quantities and returned to the token requestor 902. The token service provider 904 may implement appropriate controls and processes to generate a token based on the input PAN. In some embodiments, assurance steps may be performed based on the request.

The input data elements in a token request message may contain one or more of the token requestor ID, PAN, PAN expiry date, and requested assurance level. Optional data elements may include account holder data such as bill to/ship to address and postal code to carry out the token assurance ID&V method. The input data elements for a token request message passed through an exemplary token request and issuance interface 912 are illustrated in Table 1.

TABLE 1

Input Data Elements Passed Through Token Request and Issuance Interface

| Field Name | Length | Format | Description |
| --- | --- | --- | --- |
| Token Requester ID | 11 | Numeric | Unique ID assigned to the requestor |
| Length of PAN | 1 | Binary | Length of PAN field |
| PAN | Variable (from 13 to 19 digits) | Numeric | PAN for which the Token is requested |
| PAN Expiry Date | 4 | Numeric | PAN Expiry Date for which the Token is requested |
| Requested Assurance Level | 2 | Numeric | Present if an assurance level is being requested. |
| Token Assurance Level | 2 | Numeric | Present If the Token Requestor performed the ID&V. |
| Length of Cardholder Data | 2 | Binary | Length of Cardholder data, may contain zero (0) if not present |
| Cardholder Data | Variable | Alphanumeric | Data as necessary to support the Requested Assurance Level. Examples are billing address, shipping address, postal code and CVV2. |

In response to the token request message, the token request and issuance interface 912 may pass a response message that contains one or more of data elements, including but not limited to, the status of the request (e.g. whether the request is successful or failure) and, if the request was a failure, a reason code indicating the type of failure. For successful requests, the additional data elements such as a token and a token expiry date may be returned in the token response message. When a token assurance method has been performed at the time of the token issuance, the token request and issuance interface 912 may optionally provide the assigned token assurance level to the token requestor 902. The output data elements for a token response message passed through an exemplary token request and issuance interface 912 are illustrated in Table 2.

TABLE 2

Output Data Elements Passed Through Token Request and Issuance Interface

| Field Name | Length | Format | Description |
| --- | --- | --- | --- |
| Request Status | 1 | Numeric | Indicates success or failure of the request |
| Reason Code | Variable | Binary | Present if Request Status is not successful |
| Token | Variable (from 13 to 19 digits) | Numeric | Present if Request Status is successful, the Token is generated by the Token Service Provider. |
| Token Expiry Date | 4 | Numeric | Present if Request Status is successful, the Token Expiry Date is generated by the Token Service Provider. |
| Token Assurance Level | 2 | Numeric | Present if Request Status is successful and ID&V has been requested. |

Token Assurance (ID&V) Interface(s)

The token assurance (ID&V) interface 914 may pass a request for performing the ID&V at the issuance of the token to verify the account holder information and the PAN. The token assurance interface 914 may be provided between the token service provider 904 and the entity performing the ID&V 906. In some embodiments, the token service provider may perform the ID&V. If the token service provider 904 provides support for ID&V, the token service provider 904 may implement one or more interfaces to support ID&V methods. Additionally, the token service provider 904 may ensure that the ID&V method(s) appropriate for the requested token assurance level are performed when issuing the token. The input data elements for an ID&V request message passed through an of an exemplary token assurance (ID&V) interface are illustrated in Table 3.

TABLE 3

Input Data Elements Passed Through Token Assurance (ID&V) Interface

| Field Name | Length | Format | Field Description |
| --- | --- | --- | --- |
| Transaction Type | 2 | Numeric | NN - Purchase<br>NN - Token issuance<br>NN - Token revalidation |
| Cardholder PAN | Variable (from 13 to 19 digits) | Numeric | Primary Account Number; the financial PAN that may be linked to a Token |
| Card Expiry Date | 4 | Numeric | Expiration date of the financial PAN |
| Token Requestor ID | 11 | Numeric | A unique value assigned to the registered entity that is requesting the Token |
| Requested Assurance | 2 | Numeric | Indicates the level of validation the |

TABLE 3-continued

Input Data Elements Passed Through Token Assurance (ID&V) Interface

| Field Name | Length | Format | Field Description |
|---|---|---|---|
| Level | | | Token Requester would like to be performed such as no assurance, token requestor verification performed, token requestor assured, token service provider assured, token service provider assured with requestor data or issuer assured |
| Token Location | 2 | Numeric | Indicates the storage location of the Token such as 01 - Remote/cloud or 02 - Secure element |
| Protocol | 2 | Numeric | Describes what protocol the Token Requestor is using to communicate with the cardholder, Mobile App API and/or Browser |
| Account Verification Results | 2 | Numeric | Indicates the results of account verification, if performed, Pass or Fail |
| Token Requestor Risk Score | 4 | Numeric | Fraud risk score that is provided by the Token Requestor |
| Address Mismatch Indicator | 2 | Numeric | Populated if shipping and billing addresses are different |
| Cardholder Billing Address | Variable | Alphanumeric | Includes data such as address line 1, address line 2, city, state/province, postal code and country code |
| Device Information | Variable | Alphanumeric | The Device Information attribute is comprised of a set of attributes regarding the credential. This includes, but is not limited to, IP address, operating system, geo-location, device ID and device category, such as laptop or phone |
| Home Phone Number | 16 | Numeric | Home phone number provided by the cardholder |
| Mobile Phone Number | 16 | Numeric | Mobile phone number provided by the cardholder |
| Work Phone Number | 16 | Numeric | Work phone number provided by the cardholder |
| Account Information | Variable | Alphanumeric | The Account Information element is comprised of a set of attributes regarding the payment account, such as e-mail address, age of the account, number of PANs on file and average transaction velocity |

In response to the ID&V request, the token assurance (ID&V) interface 914 may pass a response message to the token service provider 904 that contains one or more data elements, including but not limited to, the status of the request (e.g. successful or failure) and, if the ID&V failed, the reason code explaining the type of failure. For successful requests, the token assurance (ID&V) interface 914 may return additional data elements in the ID&V response message. Exemplary output data elements for a ID&V response message passed through a token assurance (ID&V) interface 914 are illustrated in Table 4.

TABLE 4

Output Data Elements Passed Through Token Assurance (ID&V) Interface

| Field Name | Length | Format | Field Description |
|---|---|---|---|
| Cardholder PAN | Variable (from 13 to 19 digits) | Numeric | Primary Account Number; the financial PAN that may be linked to a Token |
| Assigned Assurance Level | 2 | Alphanumeric | Indicates the level of validation the Token Requestor would like to be performed, and may vary by network |
| Verification Value | Variable | Alphanumeric | Verification Value is derived by the issuer or entity that performs the authentication |
| Verification Algorithm | Variable | Alphanumeric | Indicates the algorithm used to generate the Verification Value |

De-Tokenization Interface(s)

The de-tokenization interface(s) 916 may provide the necessary mechanism to exchange an issued token by returning the original PAN and PAN expiry date credentials to the authenticated entity. The token service provider 904 may interface with other networks 908 (via the de-tokenization interface 916) for de-tokenization processing. The token service provider 904 may implement appropriate security controls to allow access to the de-tokenization interface 916. The token service provider 904 may ensure that the request is received from a recognized and authenticated source. In some embodiments, the token service provider 904 may be the payment network and the de-tokenization may be handled by the payment network. Exemplary input data elements for a de-tokenization request message passed through a de-tokenization interface 916 are illustrated in Table 5.

TABLE 5

Input Data Elements Passed Through De-Tokenization Interface

| Field Name | Length | Format | Description |
| --- | --- | --- | --- |
| Token Requester ID | 11 | Numeric | Unique ID assigned to the requestor |
| Token Length | 1 | Alpha-numeric | Length of Token |
| Token | Variable (from 13 to 19 digits) | Alpha-numeric | The issued Token |
| Token Expiry Date | 4 | Numeric | The issued Token Expiry Date |

The de-tokenization interface 916 may pass a de-tokenization response message that contains output data elements such as the status of the request (e.g. successful or failure) and, if the request is a failure, the reason code explaining the type of the failure. For successful requests, the additional data elements such as the PAN and the PAN expiry date may be returned in the de-tokenization response message. Exemplary output data elements for a de-tokenization response message passed through a de-tokenization interface 916 are illustrated in Table 6.

TABLE 6

Output Data Elements Passed Through the De-Tokenization Interface

| Field Name | Length | Format | Description |
| --- | --- | --- | --- |
| Request Status | 1 | Binary | Indicates success or failure of the request |
| Reason Code | Variable | Binary | Present if Request Status is not successful |
| PAN Length | 1 | Binary | Present if Request Status is successful, with length of PAN field |
| PAN | Variable (from 13 to 19 digits) | Numeric | Present if Request Status is successful, with PAN |
| PAN Expiry Date | 4 | Numeric | Present if Request Status is successful, with PAN expiration date |

Token Routing Interface(s)

The token routing interface(s) 918 provide the necessary mechanism to route a token transaction to the payment network 910 that is responsible for processing the transaction. In some embodiments, such as when the payment network acts as the token service provider, the routing may also involve the de-tokenization routing to route the token for de-tokenization. Exemplary input data elements for a token processing message passed through the token routing interface 918 are illustrated in Table 7.

TABLE 7

Input Data Elements Passed Through the Token Routing Interface

| Field Name | Length | Format | Description |
| --- | --- | --- | --- |
| Token Requestor ID | 11 | Numeric | Unique ID assigned to the requestor |
| Token Length | 1 | Binary | Length of Token |
| Token | Variable (from 13 to 19 digits) | Numeric | The issued Token |
| Token Expiry Date | 4 | Numeric | The issued Token Expiry Date |
| Length of Transaction Data Elements | Variable | Binary | Length of Other Transaction Data Elements field, may contain zero (0) if not present |
| Transaction Data Elements | Variable | Implementation Dependent | Other transaction data elements as necessary for the Token Service Provider to execute the request, content is proprietary to the Token Service Provider |

The token routing interface 918 may pass a token processing response message that contains output data elements such as the status of the request (e.g. successful or failure) and, if the request is a failure, the reason code explaining the type of the failure. For successful requests, the additional data elements such as the PAN and the PAN expiry date may be returned in the token processing response message. Exemplary output data elements for a token processing response message passed through a token routing interface 918 are illustrated in Table 8.

TABLE 8

Output Data Elements Passed Through the Token Routing Interface

| Field Name | Length | Format | Description |
| --- | --- | --- | --- |
| Request Status | 1 | Binary | Indicates success or failure of the request |
| Reason Code | Variable | Binary | Present if Request Status is not successful |
| PAN Length | 1 | Binary | Present if Request Status is successful, with Length of PAN field |
| PAN | Variable (from 13 to 19 digits) | Numeric | Present if Request Status is successful, with PAN |
| PAN Expiry Date | 4 | Numeric | Present if Request Status is successful, with the PAN expiration date |
| Length of Transaction Data Elements | Variable | Binary | Length of Other Transaction Data Elements field, may be zero (0) if not present |
| Transaction Data Elements | Variable | Implementation Dependent | Transaction data elements as necessary for the network to continue the transaction, content is proprietary to the Token Service Provider |

Token Lifecycle Management Interface(s)

Tokens may have ongoing management and updates due to changes to the PAN and PAN expiry date, as well as events that may cause the mapping to be deactivated by the token requestor 902. The token service provider 904 may provide lifecycle updates through the interfaces to manage changes that affect an issued token. Lifecycle events may be handled using interfaces such as unlink token interface, suspend token interface, activate token interface, update token assurance interface and update PAN attributes interface. Table 9 provides exemplary lifecycle events that may be made available as interfaces by the token service provider 904.

TABLE 9

Lifecycle Update Interfaces

| Interface | Event/Description | Requested By | Action Performed |
|---|---|---|---|
| Unlink Token | Lost or stolen device Original credential no longer valid Token requestor no longer carries the card-on-file Lost or stolen PAN Fraud alert on PAN Fault alert on token | Token Requestor Card Issuer Payment Network | The Token is unlinked from the PAN and the mapping is disabled for further use. |
| Suspend Token | Temporary deactivation due to lost or stolen device | Token Requestor | The Token-to-PAN mapping is temporarily suspended and further use may be withheld. |
| Activate Token | Resume Token-to-PAN mapping from temporary suspension | Token Requestor | The Token-to-PAN mapping is activated after a temporary suspension to allow further use. |
| Update Token Assurance | Ongoing management of the token assurance level on the token | Token Service Provider | The Token Assurance Level is updated for the Token-to-PAN mapping based on the ID&V method performed. |
| Update PAN Attributes | Updates to original credential, such as PAN expiry date | Token Requestor | Updates to the PAN attributes, such as PAN Expiry Date, are made to extend the use of the Token-to-PAN mapping. |

The ongoing changes to token-to-PAN mapping due to lifecycle events, such as PAN updates, lost or stolen devices, and deactivation of the Token due to customer relationship termination with the token requestor, may be accommodated by the token service provider when implemented according to embodiments of the present invention.

IV. Technical Advantages and Other Specifications

According to various embodiments of the present invention, a token may add value to a payment processing environment while improving visibility and protecting account holder information. Tokens can be global and multi-channel; interoperable with BIN-based tokens; bound, mapped or affiliated with underlying credentials; distinct and identifiable in the system; able to be passed through or routed by existing tokenization ecosystem entities so as to minimize ecosystem impact; compatible with existing payment technologies (e.g., Web, NFC, POS standards); capable of supporting alternative payment channel technologies (e.g., QR code); deployable as static or dynamic (e.g., limited use, time limits); able to support authentication by different entities and types (e.g., Issuer, Wallet, Merchant); and compatible with all regulatory obligations (e.g., routing decisions).

Embodiments of the present invention include the use of existing data fields, the inclusion of token-related data within current fields, as well as new data fields, in order to provide for consistency of implementation and interoperability throughout the tokenization ecosystem environment. One or more of the data fields introduced as part of some embodiments of the present invention may be optional.

Transaction authorization messages, specifically request messages that flow from a merchant to an acquirer, from the acquirer to a payment network, and from the payment network to an issuer, and all corresponding response messages, may be impacted by embodiments of the present invention. The extent of the impact may vary by use case and may be defined in the authorization message specifications communicated by participating payment networks as part of their implementation of tokenization solutions based on embodiments of the present invention.

According to various embodiments described herein, the payment network may use the token service provider to map the issued token to the PAN in an incoming authorization message prior to sending the message to the issuer. The payment network may map the PAN back to the token in any response messages sent back to the acquirer. The token service provider may indicate to the payment network when the tokens that have been deemed as lost/stolen have been marked as suspended. The token service provider may validate the token in an incoming authorization message against data elements, including token requestor ID, and provide the result to the payment network regarding the validity of the token within the token domain restriction controls. If the PAN is deemed compromised or at risk by the payment network or the issuer, the token service provider may notify the relevant token requestors of the compromise, and deactivate the associated tokens mapped to the PAN. The token service provider may continue to add and implement such capabilities as the use cases for lifecycle management of the token and PAN continue to evolve.

Token processing and the integration of participating payment networks with token vaults may provide the capability to apply specific domain restriction controls as defined for a given token requestor and use case. The domain restriction controls depend upon the availability of specific control-related data elements in the transaction processing messages and underlying data integrity, as these data elements may ensure controlled usage of tokens.

Using tokens, consumers may be able to conduct a payment transaction using existing card-on-file data replaced with token credentials and enhanced with security features. In some embodiments, the payment capability may be embedded within a device (e.g., a mobile phone or smartphone device). In some embodiments, the device may include an application or software configured to provide a prompt to users for activation of one or more payment cards to allow their use for transactions conducted using the device. The process of service activation may include a risk score and token request, an ID&V process, and token provisioning.

According to various embodiments, an in-person (or in-store) experience may allow the consumer to "tap and pay" at contactless POS terminals. The process may involve sending the token to an issuer, through a payment network. The payment network may perform a token/PAN exchange using the received token, and send the appropriate PAN to the issuer. Further, an in-app experience may allow the consumer to pay for transactions conducted with certified participating merchant application through a single click or selection on their device. The process may involve sending the token to an issuer, through a payment network. The payment network may perform a token/PAN exchange using the received token, and send the appropriate PAN to the issuer.

The token, provided by the payment network or the issuer, may be bound to an original account credential (e.g., payment device or payment account), and provisioned to the device provider for use in near field communication (NFC) and enhanced e-commerce transactions. In some embodiments, when a consumer activates a device, the consumer's account on file may be replaced with a token from a payment network.

Embodiments of the present invention does not preclude existing acquirer or other third-party implemented token solutions in which these entities generate tokens and perform token-to-PAN mapping within their tokenization ecosystem.

Product attributes, such as product type (for example, debit or credit), may be preserved for tokenized transactions.

Issuer portfolio conversions associated with the transfer of cardholder portfolios may be accommodated within any deployed token service system implemented according to embodiments of the present invention.

Table 10 provides a summary of the features that may be implemented by an acquirer, according to various embodiments of the present application. The table indicates whether the feature is applicable to a NFC transaction or an e-commerce transaction.

TABLE 10

Features implemented by an acquirer

| Feature | Change | NFC | E-Commerce |
|---|---|---|---|
| Receive and pass Token and Token expiration date in Field 2 and Field 14 | | ✓ | ✓ |
| Receive and pass Token based cryptogram in Field 55, Usage 1 for NFC transactions | | ✓ | |
| Receive and pass Token based cryptogram in Field 126.9 for eCommerce transactions | | | ✓ |
| Send the AVS data in TLV format Field 123, Usage 2 in the existing Dataset ID 66-AVS Data | ✓ | ✓ | ✓ |
| Receive Token data elements in Field 123, Usage 2, Dataset ID 68-Verification Data (Token Assurance Level, regulated/non- | ✓ | ✓ | ✓ |

TABLE 10-continued

Features implemented by an acquirer

| Feature | Change | NFC | E-Commerce |
|---|---|---|---|
| regulated; first nine digits of PAN) | | | |
| Receive PAN last 4 digits in Field 44.15 in the authorization response | ✓ | ✓ | ✓ |
| Pass Token in TCR 0 positions 5-20 that was processed in the authorization message | | ✓ | ✓ |
| Pass Token Assurance level in TCR 1 Additional Data positions 6-7 that was received in the authorization response | ✓ | ✓ | ✓ |

Table 11 provides a summary of the data elements that may be send in messages passing through the acquirer.

TABLE 11

Data elements passed to/by an acquirer

| Draft Data | Description | Positions | New Field | BASE II |
|---|---|---|---|---|
| TC x5 and TC x6, TCR 0* | Token Note: When the token to PAN relationship cannot be found, BASE II will return the transaction with a new return reason code 9E - Token to PAN relationship cannot be located | 5-20 | | ✓ |
| TC x5 and TC x6, TCR 1 | Token Assurance Level | 6-7 | ✓ | ✓ |

Table 12 provides a summary of the features that may be implemented by an issuer, according to various embodiments of the present application. The table indicates whether the feature is applicable to a NFC transaction or an e-commerce transaction.

TABLE 12

Features implemented by an issuer

| Feature | Change | NFC | E-Commerce |
|---|---|---|---|
| Receive and process POS Entry Mode for token in Field 22 | | ✓ | ✓ |
| Receive and process Token based cryptogram in Field 55, Usage 1 for NFC transactions | | ✓ | |
| Receive and process Token based cryptogram in Field 126.9 for eCommerce transactions | | | ✓ |
| Received and process the AVS data in TLV format Field 123, Usage 2 in the existing Dataset ID 66-AVS Data | ✓ | ✓ | ✓ |
| Receive Token data elements in Field 123, Usage 2, Dataset ID 68-Verification Data (Token, Token Requestor ID, Token Assurance Level) | ✓ | ✓ | ✓ |
| Receive and process the Chip Transaction Indicator in Field 60.6 with a new value of 4 (Visa-generated token data) | ✓ | ✓ | ✓ |
| Receive Token Assurance level in TCR 1 Additional data, positions 6-7 | ✓ | ✓ | ✓ |
| Receive Token in TCR 5 Payment Service Data, positions 150-165 | ✓ | ✓ | ✓ |
| Submit Token in TC 52 Retrieval Request Record, positions 88-103 | ✓ | ✓ | ✓ |
| Retain and Return Token along with PAN for chargeback exception processing, | ✓ | ✓ | ✓ |

TABLE 12-continued

Features implemented by an issuer

| Feature | Change | NFC | E-Commerce |
|---|---|---|---|
| copy requests (TC52's via Base II and 0600's via SMS) | | | |

Table 13 provides a summary of the data elements that may be send in messages passing through the issuer.

TABLE 13

Data elements passed to/by an issuer

| Draft Data and Retrieval Request | Description | Positions | New Field | BASE II |
|---|---|---|---|---|
| TC x5 and TC x6, TCR 0 | Account Number | 5-20 | | ✓ |
| TC x5 and TC x6, TCR 1 | Token Assurance Level | 6-7 | ✓ | ✓ |
| TC x5 and TC x6, TCR 5 | Token | 150-165 | ✓ | ✓ |
| TC 52, TCR 1 | Token | 88-103 | ✓ | ✓ |

The data fields illustrated in tables 10-13 are provided for illustration purposes only and should not be construed as limiting. Same or similar information may be transmitted in different data fields. These and any other data fields used to pass the information discussed herein are within the scope of the present invention.

V. Exemplary Systems

Figure 10:
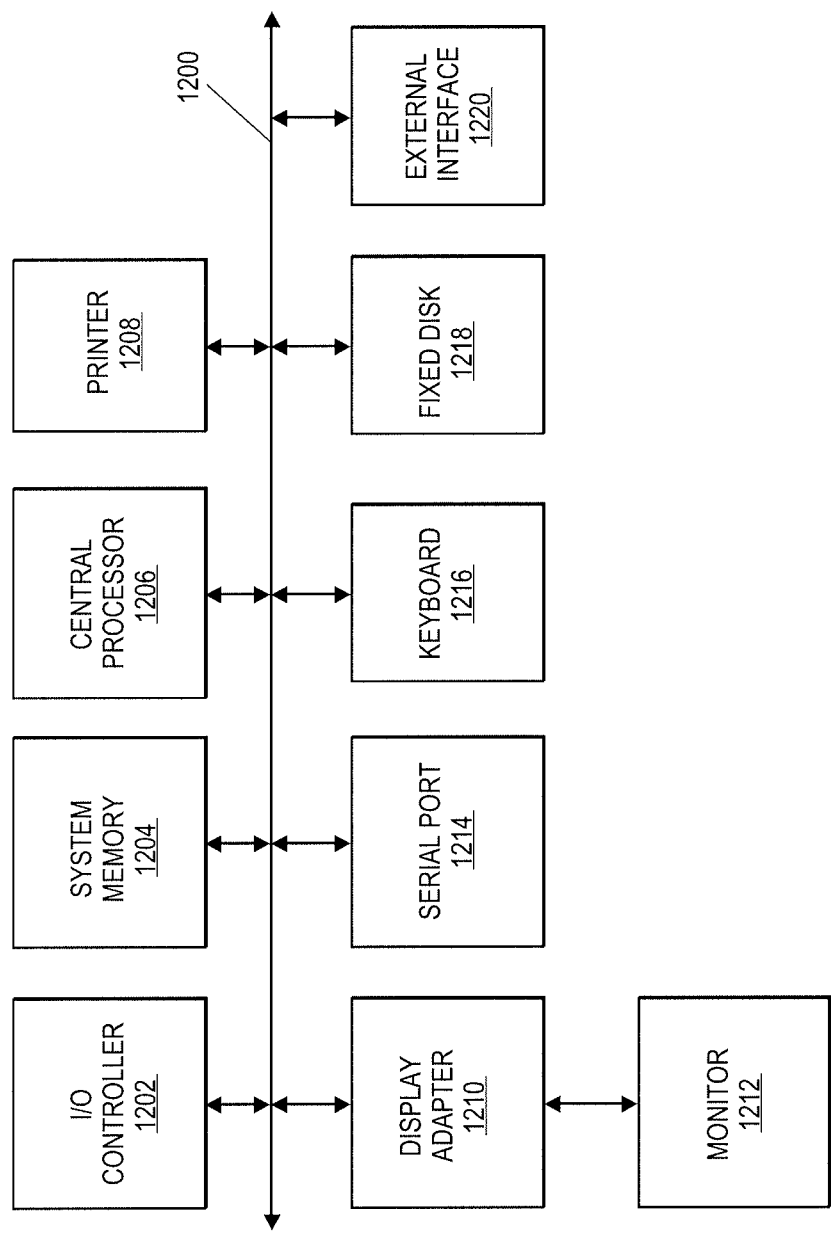
FIG. 10 shows an exemplary computer system according to embodiments of the present invention.

The various participants and elements shown in FIGS. 1-9 may operate one or more computer apparatuses (e.g., a server computer) to facilitate the functions described herein. Any of the elements in FIGS. 1-9 may use any suitable number of subsystems to facilitate the functions described herein. Examples of such subsystems or components are shown in FIG. 10. The subsystems such as a printer 1208, keyboard 1216, fixed disk 1218 (or other memory comprising computer readable media), monitor 1212, which is coupled to a display adapter 1210, and others are shown. Peripherals and input/output (I/O) devices, which couple to I/O controller 1202, can be connected to the computer system by any number of means known in the art, such as serial port 1214. For example, serial port 1214 or external interface 1220 can be used to connect the computer apparatus to a wide area network such as the Internet, a mouse input device, or a scanner. The interconnection via system bus allows the central processor 1206 to communicate with each subsystem and to control the execution of instructions from system memory 1204 or the fixed disk 1218, as well as the exchange of information between subsystems.

Specific details regarding some of the above-described aspects are provided below. The specific details of the specific aspects may be combined in any suitable manner without departing from the spirit and scope of embodiments of the invention.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which may be used to store or transmit the desired information and which may be accessed by the computer. Based on the disclosure and teachings provided herein, a person of ordinary skill in the art may appreciate other ways and/or methods to implement the various embodiments.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
    receiving, by a computer, a token generation message requesting a payment token corresponding to a primary account number from a token requestor;
    determining, by the computer, an identification and verification process verifying the token requestor;
    performing, by the computer, the identification and verification process on the token requestor;
    determining, by the computer, the payment token corresponding to the primary account number;
    identifying, by the computer, a confidence level for a binding between the payment token and the primary account number based on the identification and verification process;
    assigning, by the computer, a token assurance level representing the confidence level to the payment token based on the identification and verification process verifying the token requestor;
    storing the payment token, by the computer, the token assurance level and the primary account number corresponding to the payment token at a repository;
    transmitting, by the computer, the payment token to the token requestor;
    receiving, by the computer after transmitting the payment token to the token requestor, the payment token corresponding to the primary account number in an authorization request message associated with a transaction;
retrieving, by the computer, the token assurance level corresponding to the payment token and data used during generation of the token assurance level from the repository, wherein the data used during generation of the token assurance level includes one or more of a type of the identification and verification process performed to verify the token requestor, data used in performing the identification and verification process, and a result of the identification and verification process;
modifying, by the computer, the authorization request message to include the token assurance level and the data used during generation of the token assurance level;
transmitting, by the computer, the modified authorization request message to an issuer computer of an account corresponding to the primary account number, the issuer computer authorizes the transaction at least based upon the confidence level identified by the token assurance level; and
receiving, by the computer, an authorization response from the issuer computer.

2. The method of claim 1, wherein the token generation message includes a requested token assurance level, and wherein the token assurance level that is determined by the computer is different from the requested token assurance level.

3. The method of claim 1, further comprising:
retrieving an updated token assurance level when an additional identification and verification process is performed.

4. The method of claim 1, wherein retrieving comprises:
retrieving a first token assurance level when a first identification and verification process is performed, or
retrieving a second token assurance level different than the first token assurance level when a second identification and verification process is performed.

5. The method of claim 1, further comprising:
transmitting, by the computer, the authorization response including the token assurance level to the token requestor.

6. The method of claim 1, further comprising:
interacting with the repository storing a one-to-one mapping between one or more primary account numbers and one or more payment tokens corresponding to the one or more primary account numbers.

7. A system comprising:
a processor; and
a non-transitory computer readable medium coupled to the processor, the non-transitory computer readable medium comprising code, that when executed by the processor, causes the processor to execute the steps of:
receiving a token generation message requesting a payment token corresponding to a primary account number from a token requestor;
determining an identification and verification process verifying the token requestor;
performing the identity and verification process on the token requestor;
determining the payment token corresponding to the primary account number;
identifying a confidence level for a binding between the payment token and the primary account number based on the identification and verification process;
assigning a token assurance level representing the confidence level to the payment token based on the identification and verification process verifying the token requestor;
storing the payment token, the token assurance level and the primary account number corresponding to the payment token at a repository;
transmitting, the payment token to the token requestor;
receiving, after transmitting the payment token to the token requestor, the payment token corresponding to the primary account number in an authorization request message for a transaction;
retrieving the token assurance level corresponding to the payment token and data used during generation of the token assurance level from the repository, wherein the data used during generation of the token assurance level includes one or more of a type of the identification and verification process performed to verify the token requestor, data used in performing the identification and verification process, and a result of the identification and verification process;
modifying the authorization request message to include the token assurance level and the data used during generation of the token assurance level;
transmitting the modified authorization request message to an issuer computer of an account corresponding to the primary account number; and
receiving an authorization response from the issuer computer based upon at least the confidence level identified by the token assurance level.

8. The system of claim 7, wherein the token generation message includes a requested token assurance level, and wherein the token assurance level that is determined by the system is different from the requested token assurance level.

9. The system of claim 7, wherein the code, when executed by the processor, further causes the processor to perform the step of:
retrieving an updated token assurance level when additional identification and verification process is performed.

10. The system of claim 7, wherein retrieving comprises:
retrieving a first token assurance level when a first identification and verification process is performed on the payment token, or
retrieving a second token assurance level different than the first token assurance level when a second identification and verification process is performed.

11. The system of claim 7, wherein the code, when executed by the processor, further causes the processor to perform the step of:
transmitting the authorization response including the token assurance level to the token requestor.

12. The system of claim 7, further comprising:
the repository, the repository storing a one-to-one mapping between one or more primary account numbers and one or more payment tokens generated for the one or more primary account numbers
wherein the code, when executed by the processor, further causes the processor to perform the step of:
interacting with the repository.

* * * * *